(12) United States Patent
Hiroki

(10) Patent No.: US 9,558,687 B2
(45) Date of Patent: Jan. 31, 2017

(54) DISPLAY DEVICE AND METHOD FOR DRIVING THE SAME

(75) Inventor: Masaaki Hiroki, Isehara (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 749 days.

(21) Appl. No.: 13/413,703

(22) Filed: Mar. 7, 2012

(65) Prior Publication Data

US 2012/0229431 A1 Sep. 13, 2012

(30) Foreign Application Priority Data

Mar. 11, 2011 (JP) ................................ 2011-054824
Nov. 29, 2011 (JP) ................................ 2011-259801

(51) Int. Cl.
*G06F 19/14* (2011.01)
*G09G 3/00* (2006.01)
*G09F 19/14* (2006.01)

(52) U.S. Cl.
CPC ............... *G09F 19/14* (2013.01); *G09G 3/003* (2013.01)

(58) Field of Classification Search
CPC .... G06F 3/0418; G06F 3/04815; G06F 19/14; G09G 3/003
USPC ........................................... 345/204, 6, 419
See application file for complete search history.

(56) References Cited

U.S. PATENT DOCUMENTS

| | | |
|---|---|---|
| 5,315,377 A | 5/1994 | Isono et al. |
| 5,959,664 A | 9/1999 | Woodgate |
| 5,969,850 A | 10/1999 | Harrold et al. |
| 6,246,451 B1 | 6/2001 | Matsumura et al. |
| 6,496,218 B2 | 12/2002 | Takigawa et al. |
| 7,719,621 B2 | 5/2010 | Tsuboi et al. |
| 8,885,018 B2 | 11/2014 | Smith et al. |
| 2004/0239231 A1 | 12/2004 | Miyagawa et al. |
| 2005/0212984 A1* | 9/2005 | Wu et al. ............... 349/15 |
| 2006/0139448 A1* | 6/2006 | Ha et al. ................ 348/51 |
| 2007/0176914 A1* | 8/2007 | Bae et al. ............. 345/204 |

(Continued)

FOREIGN PATENT DOCUMENTS

| | | |
|---|---|---|
| CN | 101923257 A | 12/2010 |
| CN | 101971237 A | 2/2011 |

(Continued)

OTHER PUBLICATIONS

Chinese Office Action (Application No. 201210060735.4) Dated Jul. 7, 2015.

(Continued)

*Primary Examiner* — Aneeta Yodichkas
(74) *Attorney, Agent, or Firm* — Robinson Intellectual Property Law Office; Eric J. Robinson

(57) ABSTRACT

In order to display 3D images by a parallax barrier method, a display screen and the eyes of a viewer need to have a specific positional relation. An object is to provide a display device with an extended area where the viewer can perceive 3D images with the naked eye. Attention is focused on the position of the viewer with respect to pixels provided in a display device and a mode of a parallax barrier provided between the viewer and the pixels. This leads to a structure in which the position of the viewer with respect to pixels is specified by using an ultrasonic wave to change a mode of a parallax barrier in accordance with the position of the viewer, thereby achieving the above object.

10 Claims, 17 Drawing Sheets

(56) References Cited

U.S. PATENT DOCUMENTS

| | | | |
|---|---|---|---|
| 2008/0007511 A1* | 1/2008 | Tsuboi et al. | 345/102 |
| 2008/0043092 A1 | 2/2008 | Evans et al. | |
| 2010/0238366 A1 | 9/2010 | Chang et al. | |
| 2010/0245369 A1* | 9/2010 | Yoshino | 345/522 |
| 2010/0283833 A1* | 11/2010 | Yeh | 348/46 |
| 2011/0051239 A1* | 3/2011 | Daiku | G02B 27/0093 359/464 |
| 2011/0157696 A1 | 6/2011 | Bennett et al. | |

FOREIGN PATENT DOCUMENTS

| | | |
|---|---|---|
| JP | 09-080354 A | 3/1997 |
| JP | 10-174127 A | 6/1998 |
| JP | 11-085085 A | 3/1999 |
| JP | 2005-164916 A | 6/2005 |
| JP | 2005-258013 | 9/2005 |
| JP | 2010-277372 A | 12/2010 |
| TW | 201035966 | 10/2010 |
| WO | WO-2009/095862 | 8/2009 |
| WO | WO-2009/104818 | 8/2009 |

OTHER PUBLICATIONS

Taiwanese Office Action (Application No. 101108127) Dated Jan. 14, 2016.

\* cited by examiner

FIG. 2A
FIG. 2B
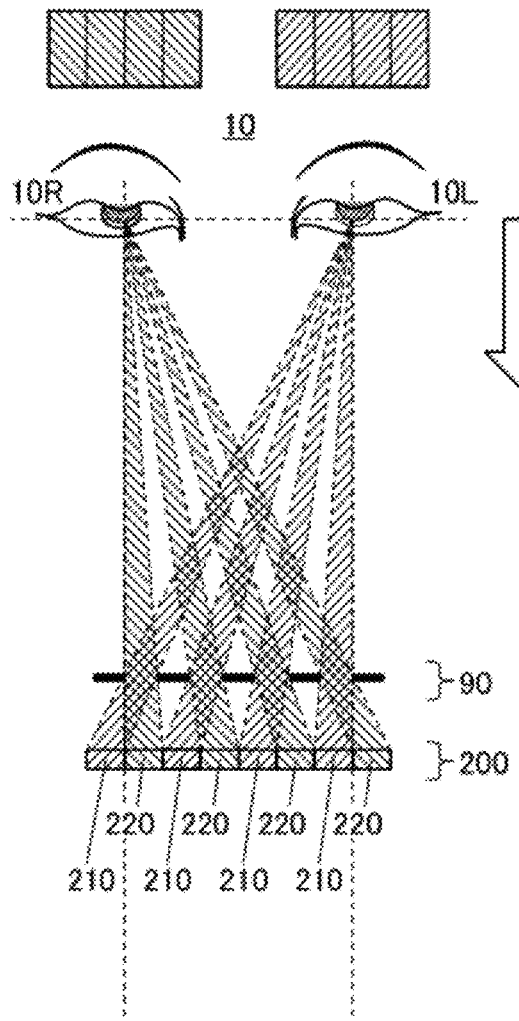
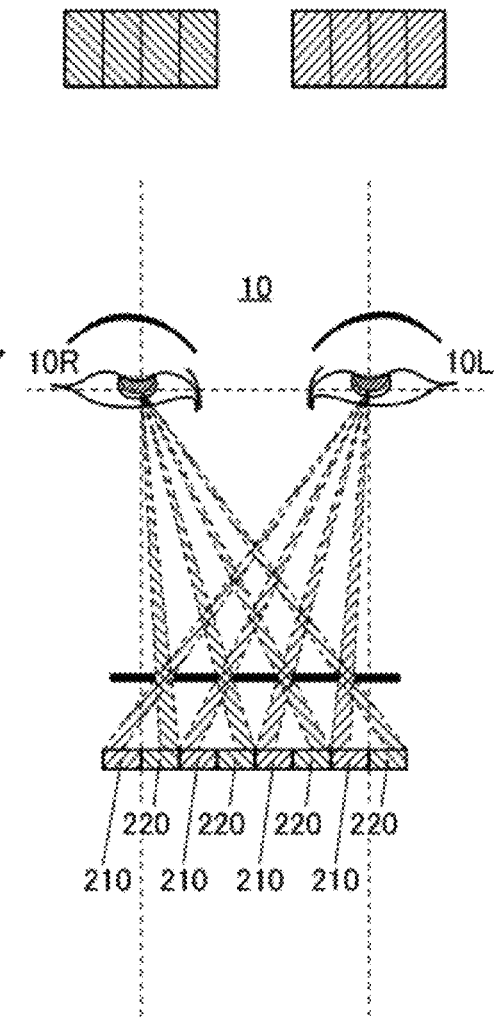

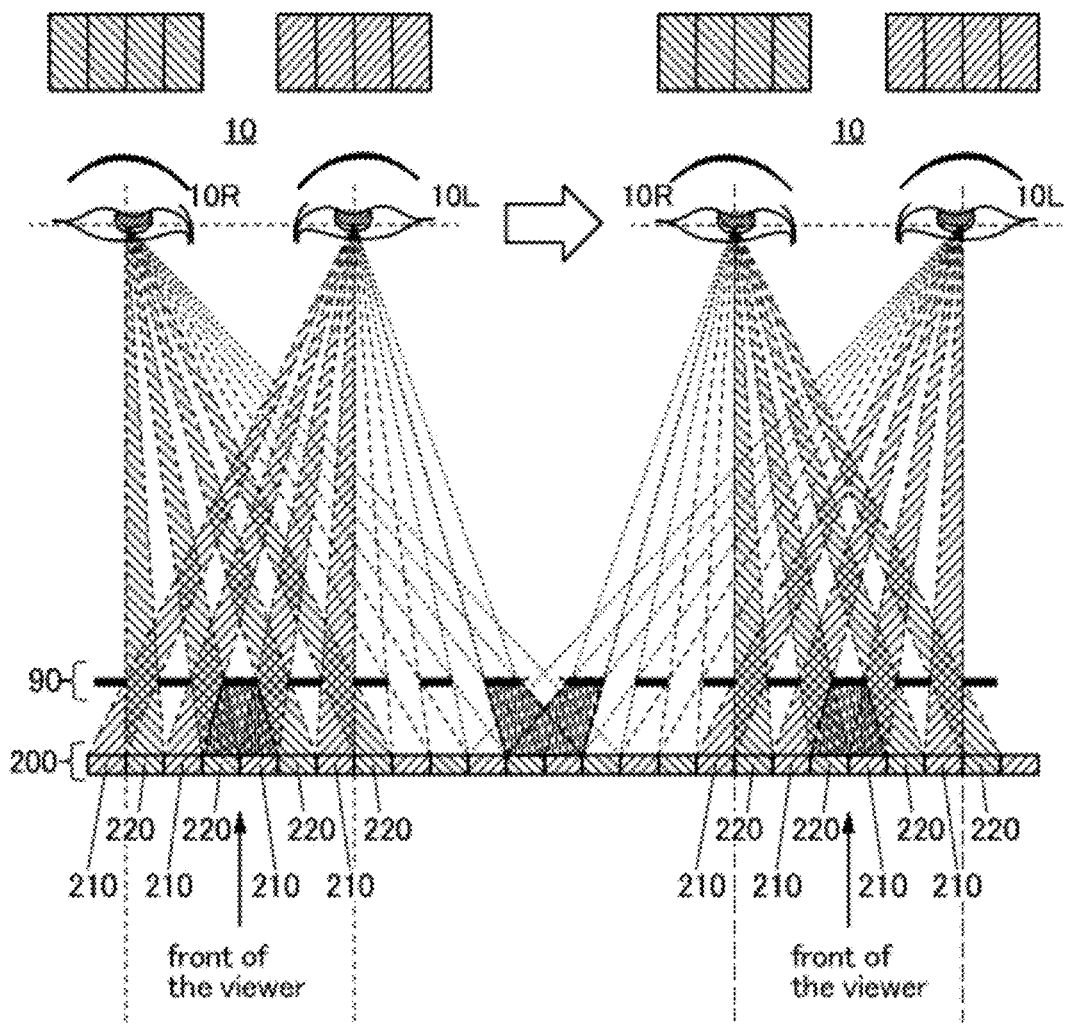

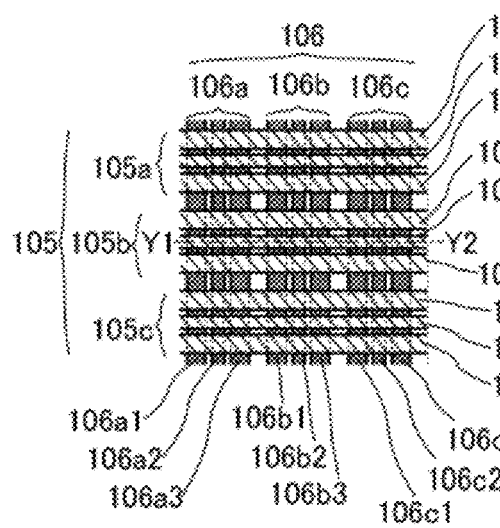
FIG. 4A1
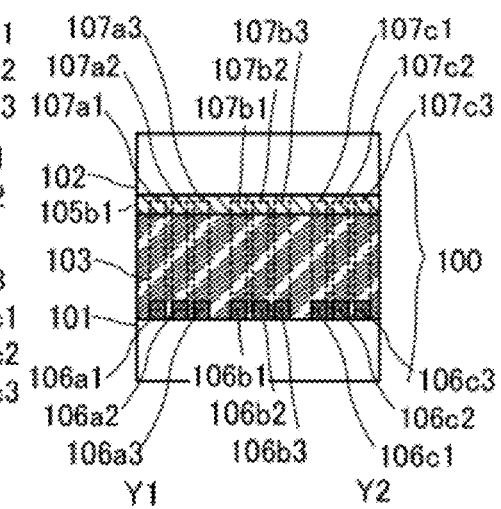
FIG. 4A2
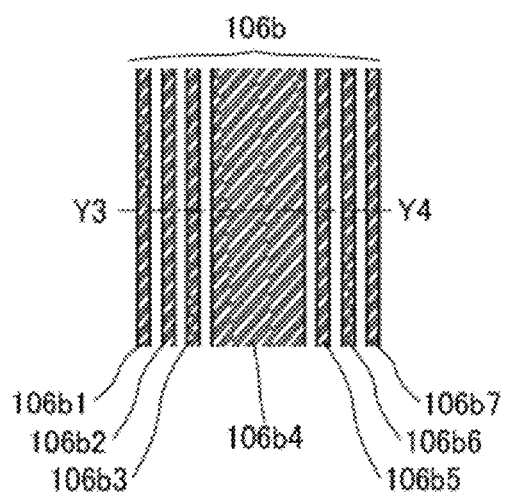
FIG. 4B1
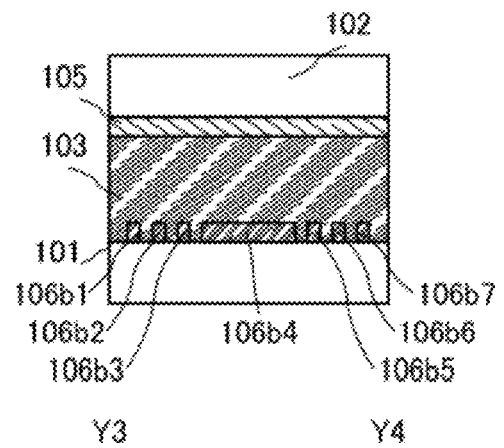
FIG. 4B2

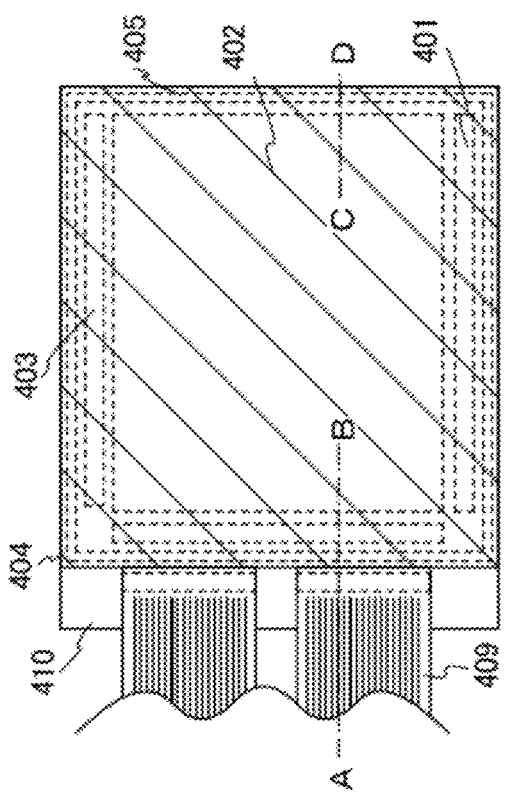
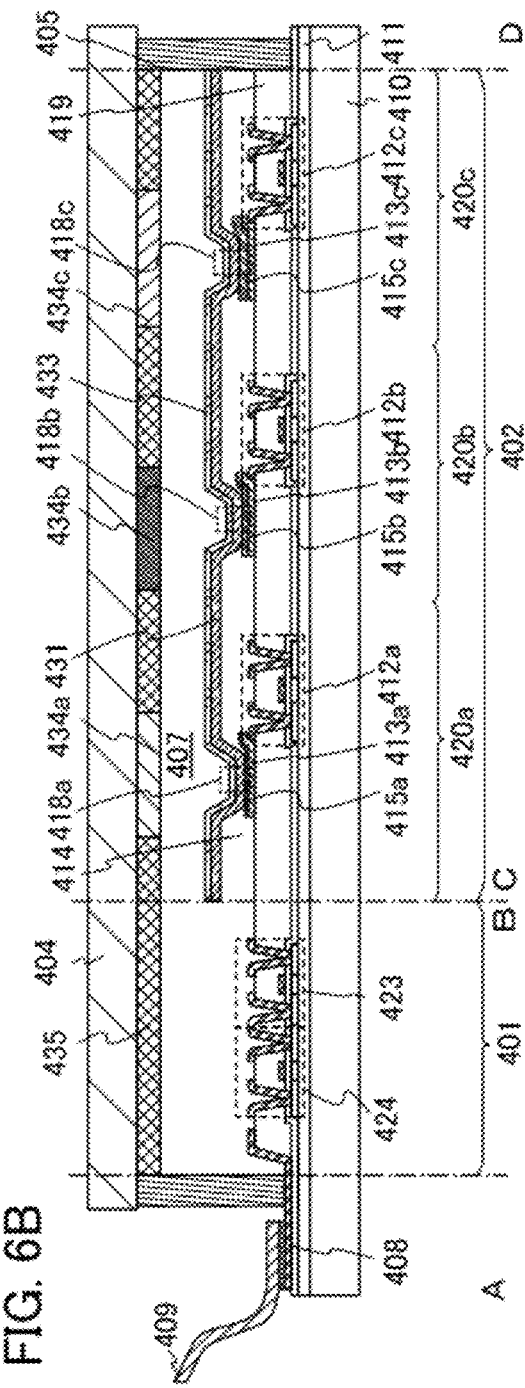
FIG. 6A
FIG. 6B

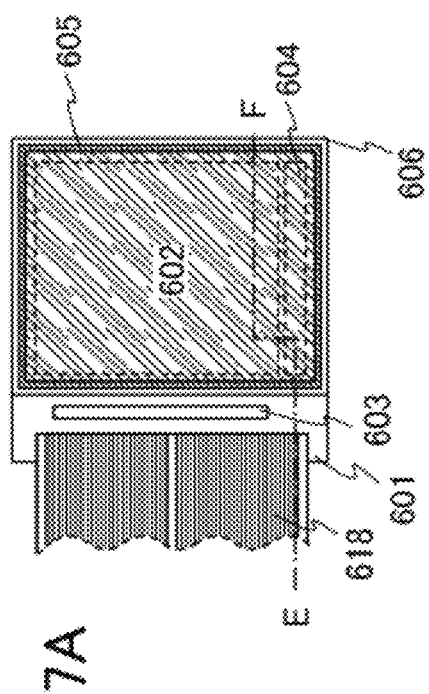
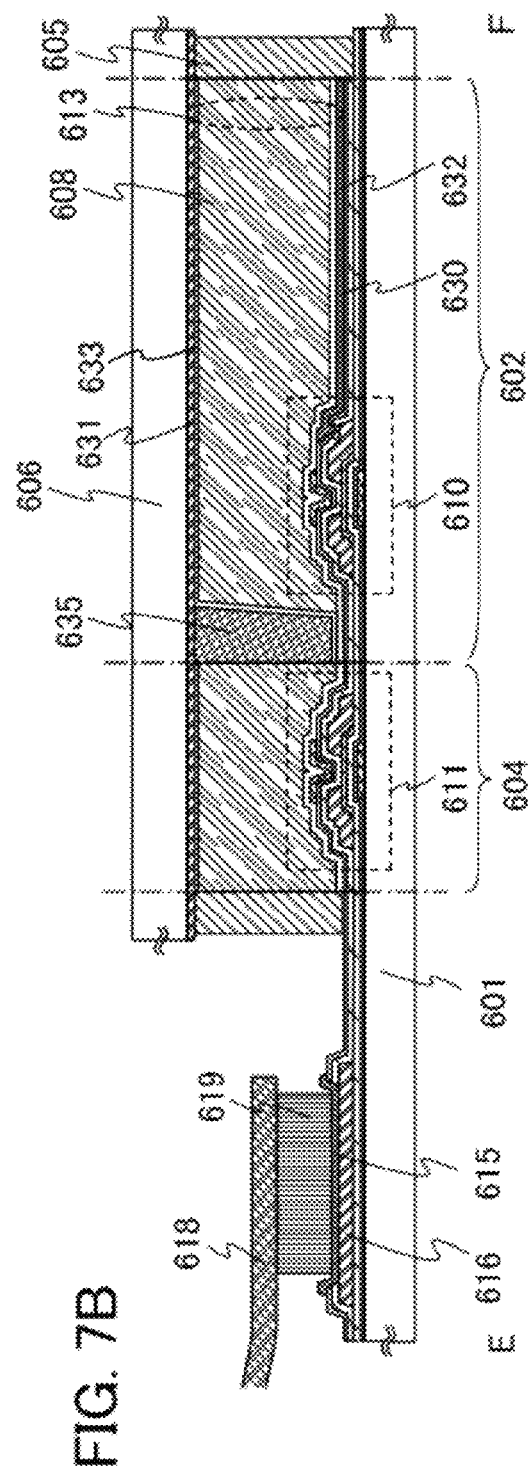
FIG. 7A
FIG. 7B

PRIOR ART  PRIOR ART

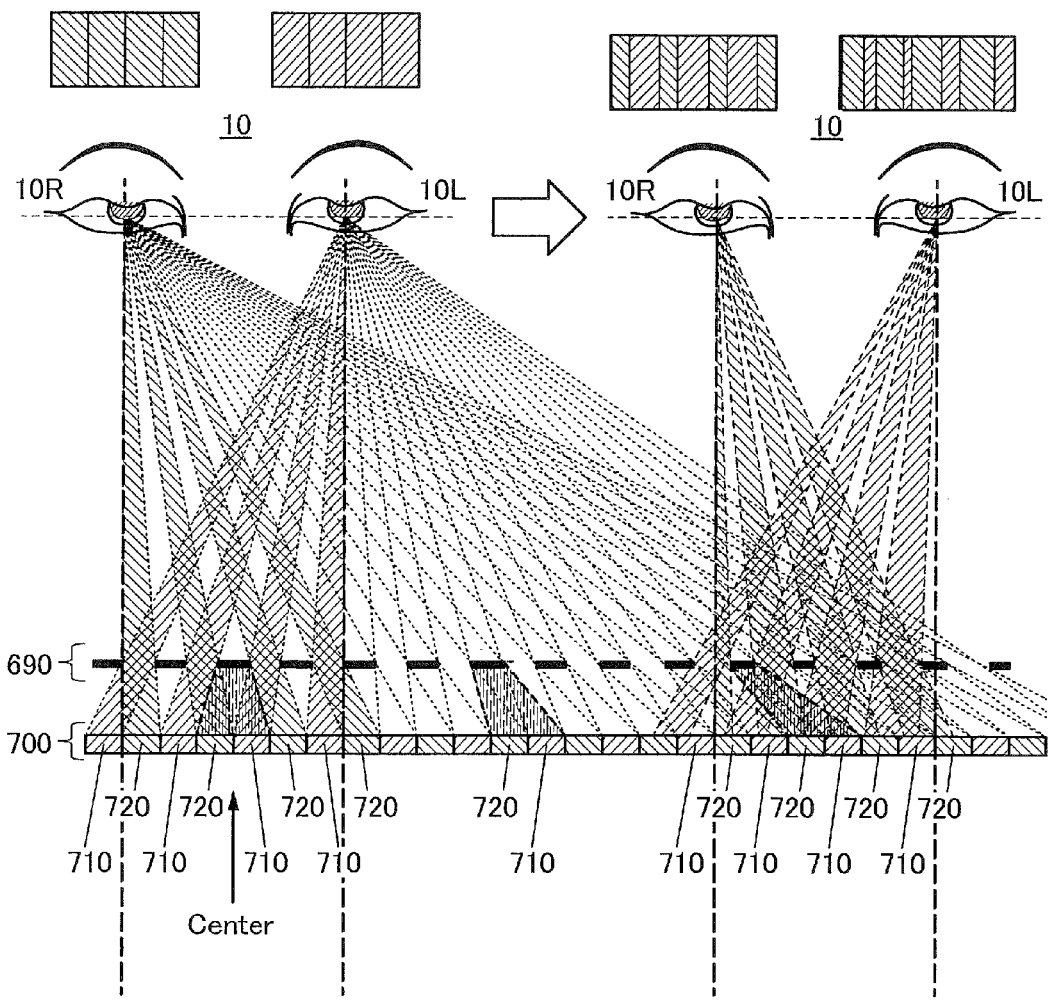

FIG. 13A-L  FIG. 13A-R
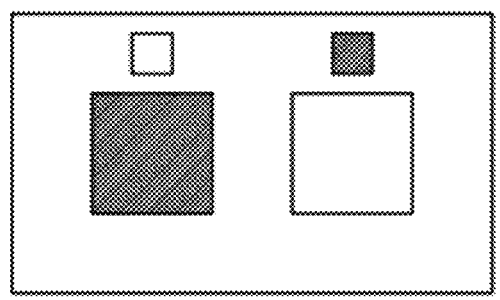
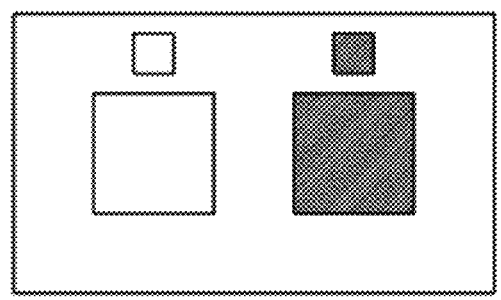
FIG. 13B
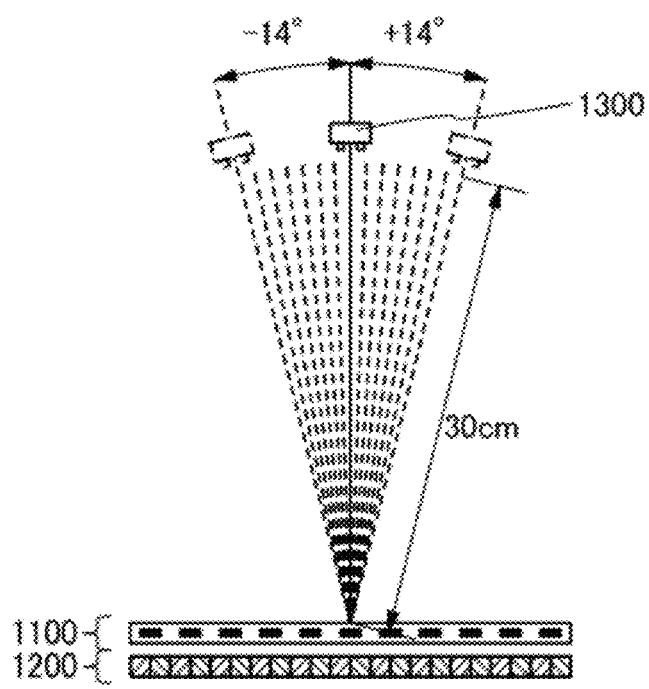

FIG. 14

| Left eye | Right eye | Angle [°] | Angle [°] | Left eye | Right eye |
|---|---|---|---|---|---|
| | | +0 | +0 | | |
| | | -2 | +2 | | |
| | | -4 | +4 | | |
| | | -6 | +6 | | |
| | | -8 | +8 | | |
| | | -10 | +10 | | |
| | | -12 | +12 | | |
| | | -14 | +14 | | |

FIG. 15

| Left eye | Right eye | Angle [°] | Angle [°] | Left eye | Right eye |
|---|---|---|---|---|---|
| | | +0 | +0 | | |
| | | -2 | +2 | | |
| | | -4 | +4 | | |
| | | -6 | +6 | | |
| | | -8 | +8 | | |
| | | -10 | +10 | | |
| | | -12 | +12 | | |
| | | -14 | +14 | | |

DISPLAY DEVICE AND METHOD FOR DRIVING THE SAME

BACKGROUND OF THE INVENTION

1. Field of the Invention

The present invention relates to a display device and a method for driving the display device, and particularly to a display device capable of displaying three-dimensional (3D) images and a method for driving the device capable of displaying 3D images.

2. Description of the Related Art

A variety of display devices ranging from large display devices such as television devices to small display devices such as mobile phones are put on the market. High value-added products will be needed and are being developed. In recent years, display devices that can display 3D images have been developed in order to display more realistic images.

As methods for displaying 3D images, there are a method using glasses for separating an image seen with a left eye and an image seen with a right eye (also referred to as stereoscopy or image separation method), and autostereoscopy (a naked eye method) by which 3D images can be seen by the naked eye by addition of a structure for separating an image seen with a left eye and an image seen with a right eye in a display portion. It is not necessary to prepare glasses to see autostereoscopic 3D images, which offers a high convenience. Autostereoscopic 3D display is coming into widespread use such as mobile phones and mobile game consoles.

As a method for displaying autostereoscopic 3D images, there is known a parallax barrier method in which a parallax barrier is added to a display portion. A parallax barrier for this method is a stripe-shaped light-shielding portion and causes a decrease in resolution when display is switched from 3D display to 2D display. In view of this, for a parallax barrier method, there is suggested a structure in which a liquid crystal panel having a patterned transparent electrode is used, and when display is switched between 2D display and 3D display, transmission or shielding of light by a liquid crystal layer is controlled by controlling voltage applied to the transparent electrode in order to set the presence or absence of a parallax barrier (see Patent Document 1).

REFERENCE

Patent Document 1: Japanese Published Patent Application No. 2005-258013

SUMMARY OF THE INVENTION

However, in order to display 3D images by a parallax barrier method, a display screen and the eyes of a viewer need to have a specific positional relation.

<Problem Caused When Viewer is Closer to 3D Display Device>

A description is given with reference to FIG. 10A of the position of the eyes of a viewer with respect to pixels and a mode of a parallax barrier provided between the viewer and the pixels at the time of displaying 3D images by a parallax barrier method. FIG. 10A schematically illustrates the viewpoint of the viewer and cross sections of a display panel 700 and a parallax barrier 690, which are cut along a plane passing through the right and left eyes of the viewer. In the parallax barrier, light-transmitting regions and light-blocking regions are alternately arranged, and the parallax barrier is mainly stripe-shaped. Note that FIG. 10A shows the cross section of the stripe-shaped parallax barrier. The display panel 700 includes a first pixel region 710 for a left eye 10L and a second pixel region 720 for a right eye 10R, and the parallax barrier 690 is placed between the first pixel region 710 and the right eye 10R and between the second pixel region 720 and the left eye 10L. With such a positional relation, the parallax barrier 690 serves as a "blindfold" for the right and left eyes. As a result, the viewer sees the first pixel region 710, where a left-eye image is displayed, with the left eye 10L and the second pixel region 720, where a right-eye image is displayed, with the right eye 10R and thus perceives 3D images. In FIG. 10A, an image perceived by the right eye 10R of a viewer 10 is shown above the right eye 10R and an image perceived by the left eye 10L is shown above the left eye 10L.

Next, the case where the viewer is closer to the display panel will be described with reference to FIG. 10B. If the viewer is closer to the display panel, the left eye 10L sees part of the second pixel region 720 adjacent to the first pixel region 710 and the right eye 10R sees part of the first pixel region 710 adjacent to the second pixel region 720. Consequently, the viewer sees part of an image for the right eye 10R, which is not supposed to be seen with the left eye 10L, and part of an image for the left eye 10L, which is not supposed to be seen with the right eye 10R; therefore, it becomes difficult for the viewer to perceive 3D images. In FIG. 10B, an image perceived by the right eye 10R of the viewer 10 is shown above the right eye 10R and an image perceived by the left eye 10L is shown above the left eye 10L. Note that a phenomenon in which one eye of the viewer sees part of an image for the other eye, which is not supposed to be seen with the one eye, is called crosstalk in this specification.

<Problem Caused When Viewer Moves Along 3D Display Device>

Next, a description is given with reference to FIGS. 11A and 11B of the difference between a mode of a parallax barrier that overlaps an outer edge portion of the display panel and a mode of a parallax barrier that overlaps a center portion of the display panel. The display panel 700 is a 3D display device used in such a manner that the viewer 10 faces the center portion (represented by an arrow in the drawing for convenience). In the center portion, the parallax barrier is formed so that its center is aligned with the boundary between a pixel for the right eye and a pixel for the left eye that are adjacent to each other. In the center portion of the display panel 700 in FIG. 11A, a pixel for the left eye 10L included in the first pixel region 710 and a pixel for the right eye 10R included in the second pixel region 720 are shown. When focusing on a trapezoid where a pair of pixels one of which is for the right eye and the other of which is for the left eye (hereinafter "a pair of right-eye and left-eye pixels") is treated as the lower base and a light-blocking portions in a parallax barrier therefor as the upper base, the trapezoid (represented by a dense hatch pattern in the drawing) is symmetrical in the center portion of the display panel 700.

However, as a parallax barrier is farther from the center portion of the display panel 700 and closer to the outer edge portion, it is made closer to the viewer (i.e., the center portion of the panel), being moved from a portion directly above the boundary where the first pixel region 710 and the second pixel region 720 are in contact with each other. This is because the viewer positions themselves to see the display panel from an oblique direction; therefore, if a parallax barrier is formed so that its center can be aligned with the boundary between the pixel for the right eye and the pixel for the left eye, the viewer sees part of an image for the right eye 10R, which is not supposed to be seen with the left eye 10L, and part of an image for the left eye 10L, which is not supposed to be seen with the right eye 10R. Thus, it becomes difficult for the viewer to perceive 3D images. For that reason, a parallax barrier is provided so that, as the parallax barrier is farther from the center portion of the display panel 700 and closer to the outer edge portion, the trapezoid (a pair of right-eye and left-eye pixels is treated as the lower base and a light-blocking portions in a parallax barrier therefor as the upper base) falls toward the center portion of the display panel 700 and is distorted.

A description is given with reference to FIG. 11B of the case where the viewer 10 moves from the center portion along the display panel in the 3D display device having the above structure. When focusing on the trapezoid (a pair of right-eye and left-eye pixels is treated as the lower base and a light-blocking portions in a parallax barrier therefor as the upper base) at the front of the viewer 10 who has moved to right, the trapezoid falls toward the center portion of the display panel 700 and is distorted. Consequently, the viewer sees part of an image for the right eye 10R, which is not supposed to be seen with the left eye 10L, and part of an image for the left eye 10L, which is not supposed to be seen with the right eye 10R; thus, it becomes difficult for the viewer to perceive 3D images. As above, in order to display 3D images by a parallax barrier method, the display screen and the eyes of the viewer need to have a specific positional relation.

An embodiment of the present invention is made in view of the foregoing technical background. Therefore, an object of one embodiment of the present invention is to provide a display device with an extended area where a viewer can perceive 3D images with the naked eye. Another object of one embodiment of the present invention is to provide a method for driving a display device with an extended area where a viewer can perceive 3D images with the naked eye.

In order to achieve the above objects, in one embodiment of the present invention, attention is focused on the position of a viewer with respect to pixels provided in a display device and a mode of a parallax barrier provided between the viewer and the pixels. This leads to a display device having a structure exemplified in this specification. According to one embodiment of the present invention, the position of a viewer with respect to pixels is specified by using an ultrasonic wave to change a mode of a parallax barrier in accordance with the position of the viewer.

That is, one embodiment of the present invention is a display device that includes a display panel including a first pixel region for a left eye and a second pixel region for a right eye; a parallax barrier that covers part of the display panel and is variable in mode; a parallax barrier control circuit configured to control a mode of the parallax barrier; a plurality of detectors; and an ultrasonic generator. The parallax barrier control circuit controls the parallax barrier in accordance with the position of the viewer specified by the plurality of detectors such that the parallax barrier prevents the right eye of the viewer from seeing the first pixel region and the left eye of the viewer from seeing the second pixel region.

In the display device according to one embodiment of the present invention, the mode of the parallax barrier is changed in accordance with the position of the viewer specified by the plurality of detectors and the ultrasonic generator with respect to pixels. Thus, the position of the right eye and left eye of the specified viewer with respect to each of the pixels included in the display device can be found. Consequently, it is possible to provide a display device with an extended area where the specified viewer can perceive 3D images with the naked eye. Further, since an ultrasonic wave is used, the position of the viewer can be accurately detected even in a dark environment. As a result, the viewer can perceive brighter and clearer 3D display images.

Another embodiment of the present invention is a display device which has the above-described structure and in which the parallax barrier is formed using a liquid crystal layer sandwiched between a pair of substrates, and at least one of the pair of substrates is provided with a plurality of electrodes for controlling alignment of liquid crystals in the liquid crystal layer and each of the plurality of electrodes is electrically connected to the parallax barrier control circuit.

In the display device according to one embodiment of the present invention, a parallax barrier is provided with a liquid crystal layer and a plurality of electrodes for controlling alignment of liquid crystals in the liquid crystal layer, and each of the electrodes is electrically connected to the parallax barrier control circuit. Thus, the mode of the parallax barrier can be changed in accordance with the position of the viewer by using the parallax barrier control circuit so that the parallax barrier can block the right eye of the viewer from seeing the first pixel region and the left eye of the viewer from seeing the second pixel region. It is therefore possible to provide a display device with an extended area where the viewer can perceive 3D images with the naked eye.

Another embodiment of the present invention is a method for driving a display device including the following six steps. In the first step, a pulsed ultrasonic wave is transmitted towards the space in front of a side where a display surface of the display device faces a viewer. In the second step, the presence or absence and position of the viewer is specified by using a time it takes for a reflected pulsed ultrasonic wave to reach each of a plurality of detectors. In the third step, a pair of right-eye and left-eye pixels facing a front of the viewer is specified by calculating coordinates where a straight line passing through the position of the viewer orthogonally crosses the display surface. In the fourth step, a distance from the pair of right-eye and left-eye pixels to the viewer is specified. In the fifth step, the size of a parallax barrier corresponding to the pair of right-eye and left-eye pixels is controlled with reference to the distance from the pair of right-eye and left-eye pixels to the viewer so that a right eye of the viewer sees the pixel for the right eye and a left eye of the viewer sees the pixel for the left eye. In the sixth step, a parallax barrier is formed so that a trapezoid in which another pair of right-eye and left-eye pixels is treated as a lower base and a light-blocking portions in a parallax barrier therefor as an upper base falls toward the viewer and is further distorted as the trapezoid is more distant from the pixels facing the front of the viewer in a horizontal direction, and so that the parallax barrier prevents the left eye of the viewer from seeing a pixel region for the right eye and the right eye of the viewer from seeing a pixel region for the left eye.

According to the method for driving the display device in one embodiment of the present invention, the mode of the parallax barrier can be changed in accordance with the position of the specified viewer by using the parallax barrier control circuit so that the parallax barrier can prevent the right eye of the viewer from seeing the first pixel region and the left eye of the viewer from seeing the second pixel region. Consequently, it is possible to provide the method for driving the display device with an extended area where the specified viewer can perceive 3D images with the naked eye.

According to one embodiment of the present invention, it is possible to provide a display device with an extended area where the specified viewer can perceive 3D images with the naked eye. According to another embodiment of the present invention, it is possible to provide a method for driving a display device with an extended area where the specified viewer can perceive 3D images with the naked eye.

BRIEF DESCRIPTION OF THE DRAWINGS

In the accompanying drawings:

FIGS. 2A and 2B illustrate the relation between a mode of a parallax barrier and the distance between a display panel according to an embodiment and a viewer;

FIGS. 3A and 3B illustrate the relation between a mode of a parallax barrier and the position of a viewer moving along a display panel according to an embodiment;

FIGS. 4A1, 4A2, 4B1, and 4B2 illustrate parallax barriers according to an embodiment;

FIGS. 6A and 6B illustrate a display panel according to an embodiment;

FIGS. 7A and 7B illustrate a display panel according to an embodiment;

FIGS. 11A and 11B illustrate a conventional technique;

FIGS. 13A-L, 13A-R, and 13B show a method for evaluating a 3D display device according to an example;

FIG. 14 shows results of evaluating a 3D display device according to an example;

FIG. 15 shows results of evaluating a 3D display device according to a comparative example;

DETAILED DESCRIPTION OF THE INVENTION

Figure 1A:
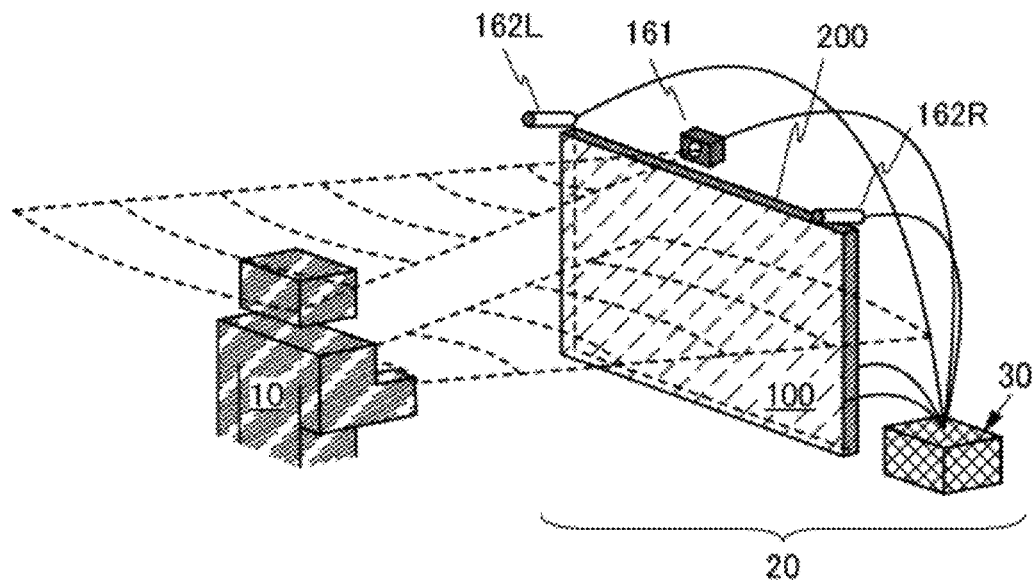
FIGS. 1A and 1B illustrate positions of a display device according to an embodiment and a user, and a configuration of the display device.

Embodiments will be described in detail with reference to the accompanying drawings. Note that the present invention is not limited to the following description, and it is easily understood by those skilled in the art that various changes and modifications can be made without departing from the spirit and scope of the present invention. Therefore, the present invention is not supposed to be construed as being limited to the description in the following embodiments. Note that in the structures of the invention described below, the same portions or portions having similar functions are denoted by the same reference numerals in different drawings, and description of such portions is not repeated.

Embodiment 1

In this embodiment, a description is given with reference to FIGS. 1A and 1B, FIGS. 2A and 2B, and FIGS. 3A and 3B of a display device in which the position of a viewer with respect to pixels is specified by using an ultrasonic wave to change a mode of a parallax barrier in accordance with the position of the viewer. Specifically, a description is given of a display device that includes a display panel including a first pixel region and a second pixel region; a parallax barrier that covers part of the display panel and is variable in mode; a parallax barrier control circuit for controlling the mode of the parallax barrier; a plurality of detectors; and an ultrasonic generator. In the display device, the parallax barrier control circuit controls the parallax barrier in accordance with the position of the viewer specified by the plurality of detectors such that the parallax barrier prevents the right eye of the viewer from seeing the first pixel region and the left eye of the viewer from seeing the second pixel region.

<Structure of Display Device>

FIG. 1A shows the positions of a display device 20 according to one embodiment of the present invention and a viewer 10 that uses the display device 20. The viewer 10 uses the display device 20 while facing a display surface.

The display device 20 includes a display panel 200, a shutter panel 100 in which a parallax barrier is formed on the display surface side of the display panel 200, and a control device 30. The display device 20 is provided with an ultrasonic generator 161 and detectors 162R and 162L, which are positioned so that a reflected wave of an ultrasonic wave emitted from the ultrasonic generator 161 toward the viewer 10 is received by the detectors.

Figure 1B:
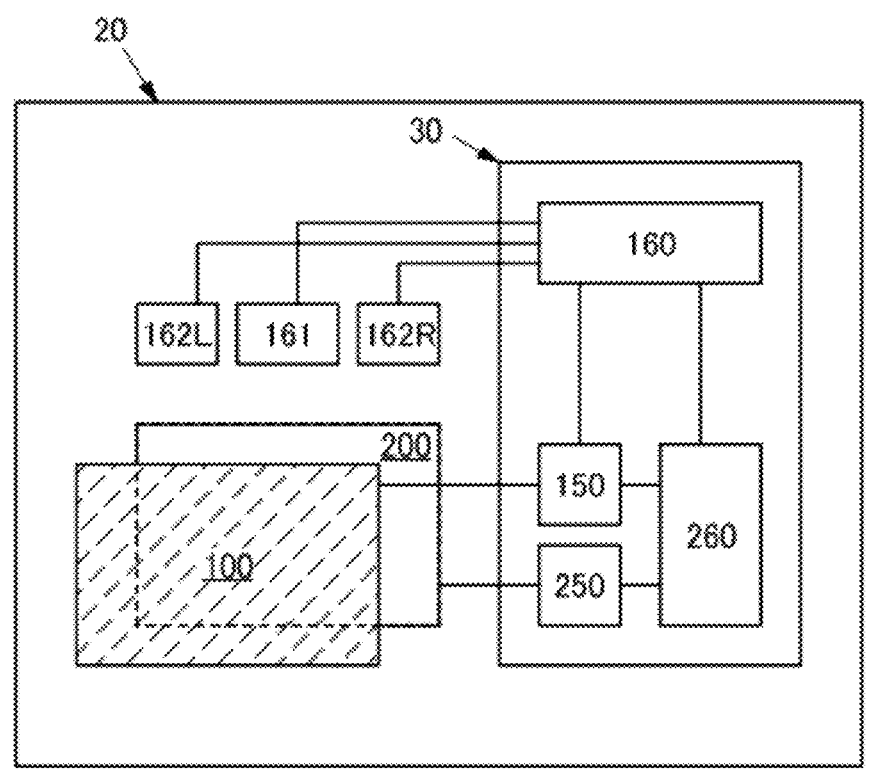

The control device 30 will be described in detail with reference to a block diagram illustrated in FIG. 1B. The control device 30 includes a viewer detection circuit 160, an image signal generation circuit 260, a parallax barrier control circuit 150, and a display panel driver circuit 250. The image signal generation circuit 260 is electrically connected to the display panel 200 through the display panel driver circuit 250 and electrically connected to the shutter panel 100 through the parallax barrier control circuit 150. The ultrasonic generator 161 and the detectors 162R and 162L are connected to the viewer detection circuit 160. The viewer detection circuit 160 is electrically connected to the parallax barrier control circuit 150 and the image signal generation circuit 260.

The image signal generation circuit 260 converts image data stored in a storage medium and image data input from an external device connected to the control device 30 into an image signal with which the display device exemplified in this embodiment can display images, and outputs the image signal. Moreover, the image signal generation circuit 260 varies an image signal, for example, in accordance with a signal that is output from the viewer detection circuit 160 and specifies the position of the viewer. Specifically, the position of the eyes of the viewer is estimated from the position of the viewer facing the display panel 200, the mode of the parallax barrier is determined so that the viewer can easily perceive 3D images, and a parallax barrier control signal is output to the parallax barrier control circuit 150 to achieve the determined mode of the parallax barrier.

Further, the image signal generation circuit 260 can vary an image signal output from a game console in accordance with location information of the viewer, for example. For instance, the story line of a video game may be selected from several options in accordance with the posture of a viewer detected.

The parallax barrier control circuit 150 drives the shutter panel 100 in accordance with a parallax barrier control signal output from the image signal generation circuit 260 to change the mode of the parallax barrier.

The display panel driver circuit 250 drives the display panel 200 in accordance with an image signal output from the image signal generation circuit 260 to display images.

<Method for Driving Display Device>

A method for driving the display device 20 according to one embodiment of the present invention will be described. The display device 20 operates by repeating the following six steps.

In the first step, the ultrasonic generator 161 transmits a pulsed ultrasonic wave to the display surface side. In the second step, the presence or absence and position of a viewer are specified using the time it takes for a reflected pulsed ultrasonic wave to reach each of the plurality of detectors.

In the subsequent third step, the image signal generation circuit 260 calculates coordinates where a straight line passing through the position of the viewer orthogonally crosses the display surface, to specify a pair of right-eye and left-eye pixels facing the front of the viewer. Then, in the fourth step, the image signal generation circuit 260 specifies the distance from the pair of right-eye and left-eye pixels to the viewer.

Next, in the fifth step, the image signal generation circuit 260 controls the size of a parallax barrier corresponding to the pair of right-eye and left-eye pixels via the parallax barrier control circuit 150 with reference to the distance from the pair of right-eye and left-eye pixels to the viewer so that the right eye of the viewer can see the pixel for the right eye and the left eye of the viewer can see the pixel for the left eye.

In the sixth step, the image signal generation circuit 260 forms the parallax barrier via the parallax barrier control circuit 150 so that a trapezoid where another pair of right-eye and left-eye pixels is treated as the lower base and a light-blocking portions in a parallax barrier therefor as the upper base falls toward the viewer and is further distorted as the trapezoid is more distant from the pixels that face the front of the viewer in the horizontal direction, and so that the parallax barrier prevents the left eye of the viewer from seeing the pixel region for the right eye and the right eye of the viewer from seeing the pixel region for the left eye. Note that the sixth step may be performed at the same time as the fifth step.

<Method for Specifying Position of Viewer With Respect to Pixels>

In this embodiment, the position of the viewer is specified by the viewer detection circuit 160 connected to the ultrasonic generator 161 provided between the two detectors 162R and 162L. Specifically, a pulsed ultrasonic wave is transmitted to a space facing the display surface of the display device by using the ultrasonic generator 161. When the viewer is present in the space, the pulsed ultrasonic wave is reflected and the reflected wave is detected by the detectors 162R and 162L. On the other hand, when the viewer is absent in the space, the pulsed ultrasonic wave passes through the space without a reflected wave returned.

The viewer detection circuit 160 measures a time after a pulsed ultrasonic wave is emitted from the ultrasonic generator 161 until the reflected wave is detected by the detectors 162R and 162L, to detect whether an object is present in the space. When the object is present in the space, the distance between the object and the detector 162R and the distance between the object and the detector 162L can be found. Moreover, object location information can be obtained from the intensity of the reflected wave.

The detectors 162R and 162L are fixed at given positions with respect to the display panel. For example, as illustrated in FIG. 1A, the detector 162R is fixed at the right edge of the display panel and the detector 162L is fixed at the left edge. Further, the pixels are fixed at given positions in the display panel. Accordingly, the position of the viewer with respect to the pixels can be specified by detecting the position of the viewer using a plurality of detectors fixed at given positions with respect to the display panel.

Note that the number of ultrasonic generators may be one or more, and a plurality of generators can be used. In addition, a plurality of detectors can be used, that is, the number of detectors is not limited to two. The increase in the number of detectors provided apart from each other enhances the accuracy of specifying the position of the viewer. The ultrasonic generator is not necessarily provided between detectors as long as an ultrasonic wave emitted from the ultrasonic generator is reflected by the viewer and the reflected wave is received by the detectors.

<Mode of Parallax Barrier According to Position of Viewer>

Next, a description is given of a mode of a parallax barrier according to the position of the viewer specified by the viewer detection circuit 160.

FIGS. 2A and 2B schematically illustrate the relation between a mode of a parallax barrier and the distance between a viewer and a display panel. FIG. 2A schematically illustrates the viewpoint of the viewer and cross sections of a display panel 200 and a parallax barrier 90, which are cut along a plane passing through the right and left eyes of the viewer. In the parallax barrier, light-transmitting regions and light-blocking regions are alternately provided. The mode of the parallax barrier can be a stripe pattern, a checkered pattern, a crossed pattern (oblique pattern), or the like. Note that FIG. 2A shows the cross section of the stripe-shaped parallax barrier. The area of the display panel seen through the gaps in the parallax barrier is extended as the viewer 10 gets closer to the display panel 200. Specifically, the left eye sees part of the second pixel region adjacent to the first pixel region, and the right eye sees part of the first pixel region adjacent to the second pixel region. As a result, the viewer sees part of an image for the right eye, which is not supposed to be seen with the left eye, and sees part of an image for the left eye, which is not supposed to be seen with the right eye; therefore, it becomes difficult for the viewer to perceive 3D images.

In view of the above, in one embodiment of the present invention, the mode of the parallax barrier is changed in accordance with the position of the viewer. Specifically, the widths of light-blocking portions in the stripe-shaped parallax barrier are increased to narrow the space between the light-blocking portions. For example, as illustrated in FIG. 2B, the widths of light-blocking portions in the parallax barrier 90 are increased in response to the viewer 10 whose distance to the display panel 200 is smaller than that in FIG. 2A, to reduce the widths of light-transmitting portions. By employing such a structure to control the mode of the parallax barrier, the left eye can see only the first pixel regions and the right eye can see only the second pixel regions even when the viewer comes close to the display panel.

Next, the case where the viewer 10 moves along the display panel from the center portion will be described with reference to FIGS. 3A and 3B, focusing on a trapezoid where a pair of right-eye and left-eye pixels is treated as the lower base and a light-blocking portions in a parallax barrier therefor as the upper base In the mode of the parallax barrier 90 that is optimized while the viewer 10 faces the center portion of the display panel (see FIG. 3A), the trapezoid falls toward the center portion of the display panel 200 and is distorted; consequently, it becomes difficult for the viewer to perceive 3D images when the viewer moves along the display panel.

In view of the above, in one embodiment of the present invention, the mode of the parallax barrier is changed in accordance with the position of the viewer. Specifically, the parallax barrier (e.g., the stripe-shaped light-blocking portion) is formed so that its center is aligned with the boundary between a pixel for the right eye and a pixel for the left eye adjacent to each other at the front of the viewer. For example, as illustrated in FIG. 3B, the parallax barrier 90 is formed so that the trapezoid in which a pixel for the left eye included in the first pixel region 210 for the left eye 10L and a pixel for the right eye included in the second pixel region 220 for the right eye 10R are treated as the lower base and the light-blocking portions in the parallax barrier 90 therefor as the upper base is symmetrical at the front of the viewer 10.

With such a structure, only the first pixel regions 210 can be seen with the left eye and only the second pixel regions 220 can be seen with the right eye at the front of the viewer 10.

As for a parallax barrier positioned on the right side or left side of the viewer, a stripe-shaped parallax barrier is formed so that the trapezoid falls toward the front side of the viewer and is further distorted as the trapezoid is more distant from the front of the viewer. This is because the viewer positions themselves to see the display panel from an oblique direction; therefore, if a parallax barrier is formed so that its center can be aligned with the boundary between the pixel for the right eye and the pixel for the left eye, the left eye sees a right-eye image and the right eye sees a left-eye image. For that reason, when focusing on a trapezoid in which a pair of right-eye and left-eye pixels is treated as the lower base and a light-blocking portions in a parallax barrier therefor as the upper base, a parallax barrier needs to be formed by controlling the width and space between light-blocking portions in the stripe-shaped parallax barrier so that the trapezoid falls toward the front side of the viewer and its distortion increases as the trapezoid is more distant from the front of the viewer.

With such a structure, the left eye can see only the first pixel regions 210 and the right eye can see only the second pixel regions 220 from a direction away from the front of the viewer.

In the display device according to one embodiment of the present invention, the mode of a parallax barrier is changed in accordance with the position of a viewer specified by a plurality of detectors and an ultrasonic generator with respect to pixels. Thus, the position of the right eye and left eye of the specified viewer with respect to each of the pixels included in the display device can be found. Consequently, it is possible to provide a display device with an extended area where the specified viewer can perceive 3D images with the naked eye. Further, since an ultrasonic wave is used, the position of the viewer can be accurately detected even in a dark environment. As a result, the viewer can perceive brighter and clearer 3D display images.

This embodiment can be freely combined with any of the other embodiments in this specification as appropriate.

Embodiment 2

In this embodiment, a shutter panel applicable to a display device in which a mode of a parallax barrier is changed in accordance with the position of a viewer with respect to pixels will be described with reference to FIGS. 4A, 4A2, 4B1, and 4B2 and FIG. 5. Specifically, a description is given of the structure of a shutter panel in which a liquid crystal layer is sandwiched between a pair of substrates, at least one of the pair of substrates is provided with a plurality of electrodes for controlling alignment of liquid crystals in the liquid crystal layer, and each of the plurality of electrodes is electrically connected to a parallax barrier control circuit.

In the shutter panel, a parallax barrier with a variety of modes is formed. Specifically, the shutter panel is constituted by a plurality of optical elements whose state is switched between a light-blocking state and a light-transmitting state. As the optical element whose state is switched between a light-blocking state and a light-transmitting state, it is preferable to use a liquid crystal element in which liquid crystals are placed between a pair of electrodes. The state (a light-blocking state or a light-transmitting state) of the liquid crystal element can be selectively controlled by controlling alignment of the liquid crystals by application of an electric field to the liquid crystal layer sandwiched between the pair of electrodes.

<Structure of Shutter Panel>

FIG. 4A1 is a top view of the shutter panel 100. FIG. 4A2 is a cross-sectional view along Y1-Y2 in FIG. 4A1.

The shutter panel 100 includes electrodes 106 on a substrate 101 and electrodes 105 on a substrate 102. The electrodes 106 include a plurality of stripe-shaped electrodes (106a1, 106a2, 106a3, 106b1, 106b2, 106b3, 106c1, 106c2, and 106c3). The electrodes 105 include a plurality of stripe-shaped electrodes (105a1, 105a2, 105a3, 105b1, 105b2, 105b3, 105c1, 105c2, and 105c3). In this embodiment, the electrodes are electrically independent of each other and can be controlled by the parallax barrier control circuit.

In the shutter panel 100, a liquid crystal layer 103 is sandwiched between the substrate 101 and the substrate 102 that overlap with each other so that the electrodes 106 intersect the electrodes 105. Liquid crystal elements are formed at positions where the stripe-shaped electrodes included in the electrodes 106 intersect the stripe-shaped electrodes included in the electrodes 105, and thus are arranged in a dotted pattern. Switching between a light-blocking state and a light-transmitting state of the liquid crystal element can be accomplished by application of voltage to the pair of stripe-shaped electrodes included in the liquid crystal element.

Specifically, as illustrated in FIG. 4A2, liquid crystal elements 107a1, 107a2, and 107a3 are formed between the electrode 105b1 and the electrodes 106a1, 106a2, and 106a3. Liquid crystal elements 107b1, 107b2, and 107b3 are formed between the electrode 105b1 and the electrodes 106b1, 106b2, and 106b3. Liquid crystal elements 107c1, 107c2, and 107c3 are formed between the electrode 105b1 and the electrodes 106c1, 106c2, and 106c3.

A plurality of such optical elements whose state is switched between a light-blocking state and a light-transmitting state are arranged in a matrix, thereby forming a parallax barrier in which a light-blocking region and a light-transmitting region can be minutely controlled. Note that it is possible that the electrodes 105a to 105c and the electrodes 106a to 106c are divided into more than two electrodes, and that the divided electrodes have different line widths.

FIG. 4B1 is a top view of another structure of the electrode 106b applicable to the shutter panel 100. FIG. 4B2 is a cross-sectional view along Y3-Y4 of the electrode 106b in the shutter panel in which the electrodes 105 overlap the electrode 106b so as to intersect the electrode 106b and the liquid crystal layer 103 is sandwiched between the substrate 101 and the substrate 102.

As the electrode 106b illustrated in FIGS. 4B1 and 4B2, a plurality of electrodes with a narrow line width (106b1, 106b2, 106b3, 106b5, 106b6, and 106b7) are provided on the both sides of an electrode 106b4. In this manner, the electrodes 106 and the electrodes 105 do not necessarily have the same width.

<Method for Driving Shutter Panel>

A method for driving the shutter panel including the electrode 106b illustrated in FIGS. 4B1 and 4B2 will be described.

When a viewer is relatively far from the display panel, the parallax barrier control circuit selects the electrode 106b4 to form a parallax barrier. When the viewer comes closer to the display panel, the parallax barrier control circuit additionally selects the electrodes 106b3 and 106b5 adjacent to the electrode 106b4 and drives the shutter panel so that a light-blocking region of the parallax barrier is extended. By driving the shutter panel 100 in such a manner, the left eye can see only the pixel regions for the left eye and the right eye can see only the pixel regions for the right eye even when the viewer is close to the display panel. As a result, the area where the viewer can perceive 3D images is extended.

The parallax barrier control circuit selects the electrode 106b4 when the viewer is positioned at the front of the electrode 106b4, and selects the electrode 106b5 in addition to the electrode 106b4 when the viewer is positioned on the right side (from our view) of the front of the electrode 106b4 so that a light-blocking region of the parallax barrier is extended to the viewer side. By driving the shutter panel 100 in such a manner, the left eye can see only the pixel regions for the left eye and the right eye can see only the pixel regions for the right eye even when the viewer is close to the display panel. Consequently, the area where the viewer can perceive 3D images is extended.

<Another Structure of Shutter Panel>

Figure 5:
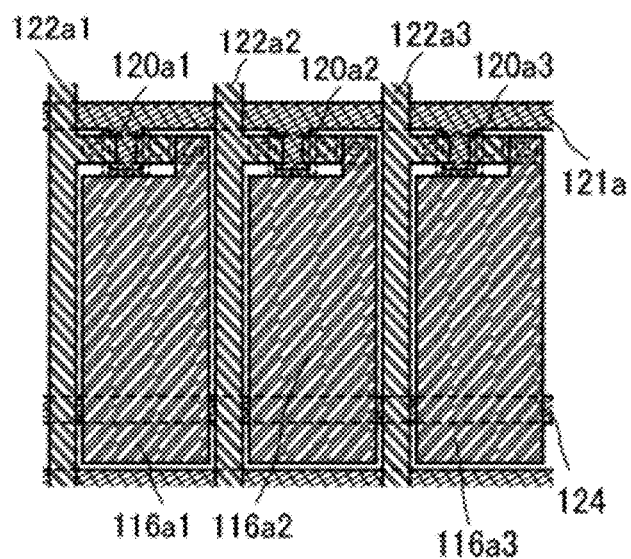
FIG. 5 illustrates a parallax barrier according to an embodiment.

In addition, an element that functions as a switch electrically connected to a liquid crystal element can be provided to control the liquid crystal element. FIG. 5 illustrates an example of a shutter panel in which a transistor is provided as an element functioning as a switch to drive a liquid crystal element.

The shutter panel in FIG. 5 includes a first liquid crystal element having an electrode 116a1 electrically connected to a transistor 120a1, a second liquid crystal element that is adjacent to the first liquid crystal element and has an electrode 116a2 electrically connected to a transistor 120a2, a third liquid crystal element having an electrode 116a3 electrically connected to a transistor 120a3, and a capacitor wiring 124. Although not illustrated, electrodes paired with the electrodes 116a1 to 116a3 are provided over the electrodes 116a1 to 116a3 with liquid crystals placed therebetween.

The transistors 120a1, 120a2, and 120a3 electrically connected to a wiring 121a are electrically connected to a wiring 122a1, a wiring 122a2, and a wiring 122a3, respectively.

FIG. 5 shows an example in which the sizes (areas) of the electrodes 116a1, 116a2, and 116a3 are almost the same; however, there is no particular limitation on the sizes, and the electrodes 116a1 to 116a3 may have different sizes. Further, a larger number of (three or more) liquid crystal elements may be provided on the both sides of the liquid crystal element having the electrode 116a.

When 3D images are to be displayed, the light-blocking region can be selectively determined by controlling the first, second, and third liquid crystal elements. For example, a first light-blocking region formed by driving only the first liquid crystal element, a second light-blocking region formed by driving the first and second liquid crystal elements, and a third light-blocking region formed by driving the first, second, and third liquid crystal elements can be formed.

By driving the shutter panel 100 in such a manner, the left eye can see only the pixel regions for the left eye and the right eye can see only the pixel regions for the right eye even when the viewer is close to the display panel. As a result, the area where the viewer can perceive 3D images is extended.

Although not shown in this embodiment, the shutter panel is provided with an optical film such as a polarizing plate, a retardation plate, or an anti-reflection film, or the like as appropriate. For the shutter panel, a transmissive liquid crystal element with a variety of structures and a variety of liquid crystal modes can be employed.

For example, with the structure where liquid crystals are sandwiched between a pair of electrodes like the structures illustrated in FIGS. 4A1 to 4B2, the gray level can be controlled by generating an electric field substantially vertical to the substrate to move liquid crystal molecules in a plane vertical to the substrate. Further, the electrodes of the liquid crystal element in FIG. 5 can have a structure for an IPS or FFS mode, in which case the gray level can be controlled by generating an electric field substantially parallel (horizontal) to the substrate to move liquid crystal molecules in a plane parallel to the substrate.

There is no particular limitation on the structure of the transistor used in the shutter panel; for example, a staggered transistor or a planar transistor having a top-gate structure or a bottom-gate structure can be used. The transistor may have a single-gate structure in which one channel formation region is formed, a double-gate structure in which two channel formation regions are formed, or a triple-gate structure in which three channel formation regions are formed. Alternatively, the transistor may have a dual-gate structure including two gate electrode layers positioned over and below a channel formation region with a gate insulating layer provided therebetween.

This embodiment can be implemented in appropriate combination with the structures described in the other embodiments.

Embodiment 3

In this embodiment, examples of the structure of a display panel applicable to the display panel in Embodiment 1 will be described with reference to FIGS. 6A and 6B and FIGS. 7A and 7B.

As a display element provided in the display panel, a light-emitting element (also referred to as a light-emitting display element) or a liquid crystal element (also referred to as a liquid crystal display element) can be used. A light-emitting element includes, in its category, an element whose luminance is controlled by current or voltage, and specifically includes an inorganic electroluminescent (EL) element, an organic EL element, and the like.

FIGS. 6A and 6B illustrate an example of the structure of a display panel in which an organic EL element is used as a display element. FIG. 6A is a plan view of the display panel. FIG. 6B is a cross-sectional view along A-B and C-D in FIG. 6A. An element substrate 410 is fixed to a sealing substrate 404 with a sealant 405, and includes driver circuit units (a source driver circuit 401 and a gate driver circuit 403) and a pixel portion 402 including a plurality of pixels.

A wiring 408 is a wiring for transmitting signals input to the source driver circuit 401 and the gate driver circuit 403, and receives a video signal, a clock signal, a start signal, a reset signal, and the like from a flexible printed circuit (FPC) 409 serving as an external input terminal Although only the FPC is illustrated here, a printed wiring board (PWB) may be attached to the FPC. The display panel in this specification includes not only a main body of the display panel but one with an FPC or a PWB attached thereto.

The driver circuit units (the source driver circuit 401 and the gate driver circuit 403) and the pixel portion 402 are formed over the element substrate 410. FIG. 6B illustrates the source driver circuit 401, which is the driver circuit unit, and three pixels in the pixel portion 402.

This embodiment explains an example in which the pixel portion 402 includes pixels of three colors: a blue (B) pixel 420a, a green (G) pixel 420b, and a red (R) pixel 420c. Note that this embodiment is not limited to this example, and a display panel can display multi-color images by including pixels of at least two colors in the pixel portion 402, or alternatively may be a display panel for single color display.

Pixels 420a, 420b, and 420c respectively include color filter layers 434a, 434b, and 434c; light-emitting elements 418a, 418b, and 418c; and transistors 412a, 412b, and 412c that are electrically connected to the light-emitting elements 418a, 418b, and 418c and function as switching transistors. Moreover, a black matrix 435 that surrounds the color filter layers 434a, 434b, and 434c is formed.

The color filter layer can be provided to correspond to the color of each pixel. For example, the color filter layer 434a of the blue (B) pixel 420a is blue; the color filter layer 434b of the green (G) pixel 420b is green; and the color filter layer 434c of the red (R) pixel 420c is red.

The light-emitting elements 418a, 418b, and 418c include respective reflective electrodes 413a, 413b, and 413c, an EL layer 431, and a light-transmitting electrode 433. Each of the reflective electrodes 413a, 413b, and 413c is used as one of an anode and a cathode, and the light-transmitting electrode 433 is used as the other of the anode and the cathode.

The EL layer 431 has at least a light-emitting layer. The EL layer 431 can have a stacked structure including a hole-injection layer, a hole-transport layer, an electron-transport layer, an electron-injection layer, and/or the like in addition to the light-emitting layer. In addition, a plurality of EL layers may be stacked, and a charge generation layer may be provided between one EL layer and another EL layer. When a plurality of light-emitting layers are stacked between the anode and the cathode, the light-emitting element can emit white light, for example.

Light-transmitting conductive layers 415a, 415b, and 415c may be provided between the respective reflective electrodes 413a, 413b, and 413c and the EL layer 431. The light-transmitting conductive layers 415a, 415b, and 415c have a function of adjusting the optical distance between the reflective electrodes 413a, 413b, and 413c and the light-transmitting electrode 433 in each pixel. By enhancing a desired spectrum with a microcavity for each light-emitting element, a display panel with high color purity can be provided.

FIG. 6B shows the top-emission display panel that includes a combination of light-emitting elements emitting white light and color filters; the display panel can be a top-emission display panel including light-emitting elements formed by a separate coloring method. A separate coloring method is a method by which materials for RGB are applied to respective pixels by evaporation or the like.

When the light-emitting layer is formed as a continuous film instead of being separately formed for every pixel using a metal mask, a reduction in yield and complication of the process due to the use of the metal mask can be avoided. Consequently, a high definition display panel with high color reproducibility can be achieved.

As the source driver circuit 401, a CMOS circuit including a combination of an n-channel transistor 423 and a p-channel transistor 424 is formed. The gate driver circuit 403 may be constituted by a variety of circuits formed with transistors, such as a CMOS circuit, a PMOS circuit, or an NMOS circuit. This embodiment explains the example in which the source driver circuit and the gate driver circuit are formed over the substrate; however, the structure is not necessarily limited thereto, and part or all of the source driver circuit and the gate driver circuit can be formed on the periphery of the substrate instead of over the substrate.

An insulator 414 is formed to cover end portions of the reflective electrodes 413a, 413b, and 413c and the light-transmitting conductive layers 415a, 415b, and 415c. Here, the insulator 414 is formed using a positive type photosensitive acrylic resin film.

In order to improve the coverage, the insulator 414 is provided such that either an upper end portion or a lower end portion of the insulator 414 has a curved surface with a curvature. For example, when positive type photosensitive acrylic is used as a material for the insulator 414, it is preferable that only the upper end portion of the insulator 414 have a curved surface with a curvature radius (0.2 μm to 3 μm). The insulator 414 can be formed using either a negative type which becomes insoluble in an etchant by light irradiation or a positive type which becomes soluble in an etchant by light irradiation.

The sealing substrate 404 is attached to the element substrate 410 with the sealant 405; thus, the light-emitting elements 418a, 418b, and 418c are provided in a space 407 enclosed by the element substrate 410, the sealing substrate 404, and the sealant 405. The space 407 is filled with a filler such as an inert gas (e.g., nitrogen or argon), an organic resin, or the sealant 405. As the organic resin and the sealant 405, materials containing a hygroscopic substance may be used.

Note that as the sealant 405, an epoxy-based resin is preferably used. It is preferable that such a material do not transmit moisture or oxygen as much as possible. As the sealing substrate 404, a glass substrate, a quartz substrate, or a plastic substrate of fiberglass-reinforced plastics (FRP), polyvinyl fluoride (PVF), polyester, acrylic, or the like can be used.

As in this embodiment, an insulating film 411 serving as a base film may be provided between the element substrate 410 and a semiconductor layer of the transistor. The insulating film has a function of preventing diffusion of an impurity element from the element substrate 410, and can be formed with a single-layer structure or a stacked structure using one or more of a silicon nitride film, a silicon oxide film, a silicon nitride oxide film, and a silicon oxynitride film.

In this embodiment, there is no particular limitation on the structure of the transistor applicable to the display panel; for example, a staggered transistor or a planar transistor having a top-gate structure or a bottom-gate structure can be used. The transistor may have a single-gate structure in which one channel formation region is formed, a double-gate structure in which two channel formation regions are formed, or a triple-gate structure in which three channel formation regions are formed. Alternatively, the transistor may have a dual-gate structure including two gate electrode layers positioned over and below a channel formation region with a gate insulating layer provided therebetween.

The gate electrode layer can be formed with a single-layer structure or a layered structure using a metal material such as molybdenum, titanium, chromium, tantalum, tungsten, aluminum, copper, neodymium, or scandium, or an alloy or a compound that contains any of these materials as its main component.

For example, as a two-layer structure of the gate electrode layer, the following structures are preferable: a two-layer structure of an aluminum layer and a molybdenum layer stacked thereover, a two-layer structure of a copper layer and a molybdenum layer stacked thereover, a two-layer structure of a copper layer and a titanium nitride layer or a tantalum nitride layer stacked thereover, and a two-layer structure of a titanium nitride layer and a molybdenum layer. As a three-layer structure, it is preferable to employ a stacked structure in which a tungsten layer or a tungsten nitride layer, an aluminum-silicon alloy layer or an alloy layer of aluminum and titanium, and a titanium nitride layer or a titanium layer are stacked.

The gate insulating layer can be formed with a single-layer structure or a stacked structure of a silicon oxide layer, a silicon nitride layer, a silicon oxynitride layer, and/or a silicon nitride oxide layer by plasma CVD, sputtering, or the like. Alternatively, a silicon oxide layer formed by CVD using an organosilane gas can be used as the gate insulating layer. As an organosilane gas, a silicon-containing compound such as tetraethoxysilane (TEOS: $Si(OC_2H_5)_4$), tetramethylsilane (TMS: $Si(CH_3)_4$), tetramethylcyclotetrasiloxane (TMCTS), octamethylcyclotetrasiloxane (OMCTS), hexamethyldisilazane (HMDS), triethoxysilane ($SiH(OC_2H_5)_3$), or tris(dimethylamino)silane ($SiH(N(CH_3)_2)_3$) can be used.

A material of the semiconductor layer is not limited to a particular material and determined in accordance with characteristics needed for the transistors 412a, 412b, 412c, 423, and 424 as appropriate. Examples of a material that can be used for the semiconductor layer will be described.

The semiconductor layer can be formed using the following material: an amorphous semiconductor manufactured by sputtering or by vapor-phase growth using a semiconductor material gas typified by silane or germane; a polycrystalline semiconductor formed by crystallizing the amorphous semiconductor with the use of light energy or thermal energy; a microcrystalline semiconductor; or the like. The semiconductor layer can be deposited by sputtering, LPCVD, plasma CVD, or the like.

For the semiconductor layer, a single crystal semiconductor (e.g., single crystal silicon or single crystal silicon carbide) can be used. When a single crystal semiconductor is used for the semiconductor layer, the size of the transistor can be reduced, leading to a higher density of pixels in a display portion. When a single crystal semiconductor is used for the semiconductor layer, an SOI substrate including a single crystal semiconductor layer can be used. Alternatively, a semiconductor substrate such as a silicon wafer may be used.

A typical example of an amorphous semiconductor is hydrogenated amorphous silicon, and a typical example of a crystalline semiconductor is polysilicon. Examples of polysilicon (polycrystalline silicon) are high-temperature polysilicon that contains polysilicon formed at a process temperature of 800° C. or higher as its main component, low-temperature polysilicon that contains polysilicon formed at a process temperature of 600° C. or lower as its main component, and polysilicon obtained by crystallizing amorphous silicon using an element that promotes crystallization or the like. Needless to say, a microcrystalline semiconductor or a semiconductor that includes a crystalline phase in part of a semiconductor layer can be used as described above.

Further, an oxide semiconductor may be used. Examples of an oxide semiconductor are an In—Sn—Ga—Zn—O-based oxide semiconductor which is an oxide of four metal elements; an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, and a Sn—Al—Zn—O-based oxide semiconductor which are oxides of three metal elements; an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, and In—Ga—O-based oxide semiconductor which are oxides of two metal elements; and an In—O-based oxide semiconductor, a Sn—O-based oxide semiconductor, and a Zn—O-based oxide semiconductor which are oxides of one metal element. Moreover, $SiO_2$ may be contained in the above oxide semiconductor. Here, for example, the In—Ga—Zn—O-based oxide semiconductor means an oxide containing at least In, Ga, and Zn, and there is no particular limitation on the composition ratio of the elements. The In—Ga—Zn—O-based oxide semiconductor may contain an element other than In, Ga, and Zn.

For the oxide semiconductor layer, a thin film expressed by a chemical formula of $InMO_3(ZnO)_m$ (m>0) can be used. Here, M represents one or more metal elements selected from Ga, Al, Mn, and Co. For example, M can be Ga, Ga and Al, Ga and Mn, or Ga and Co.

In the case where an In—Zn—O-based material is used as the oxide semiconductor, the atomic ratio is In/Zn=0.5 to 50, preferably In/Zn=1 to 20, further preferably In/Zn=1.5 to 15. When the atomic ratio of In to Zn is in the above preferred range, the field-effect mobility of the transistor can be improved. Here, when the atomic ratio of the compound is In:Zn:O=X:Y:Z, the relation Z>1.5X+Y is satisfied.

For the oxide semiconductor layer, it is possible to use an oxide semiconductor that has neither a single crystal structure nor an amorphous structure and is a crystalline oxide semiconductor having c-axis alignment (also referred to as a c-axis aligned crystalline oxide semiconductor (CAAC-OS)).

Examples of a material of wiring layers serving as source and drain electrode layers are an element selected from Al, Cr, Ta, Ti, Mo, and W; an alloy or a compound containing any of the above elements as its component; and an alloy or a compound containing a combination of any of these elements. Further, in the case where heat treatment is performed, the conductive film preferably has heat resistance against the heat treatment. Since the use of aluminum alone brings disadvantages such as low heat resistance and a tendency to corrosion, aluminum is used in combination with a conductive material having heat resistance. As the conductive material having heat resistance, which is used in combination with aluminum, it is possible to use an element selected from titanium (Ti), tantalum (Ta), tungsten (W), molybdenum (Mo), chromium (Cr), neodymium (Nd), and scandium (Sc), an alloy containing any of these elements as its component, an alloy containing a combination of any of these elements, or a nitride containing any of these elements as its component.

As an insulating film 419 that covers the transistor, an inorganic insulating film or an organic insulating film formed by a dry method or a wet method can be used. For example, it is possible to use a silicon nitride film, a silicon oxide film, a silicon oxynitride film, an aluminum oxide film, a tantalum oxide film, or a gallium oxide film formed by CVD, sputtering, or the like. Moreover, an organic material such as polyimide, acrylic, benzocyclobutene, polyamide, or an epoxy resin can be used. Other than such organic materials, it is also possible to use a low-dielectric constant material (a low-k material), a siloxane-based resin, PSG (phosphosilicate glass), BPSG (borophosphosilicate glass), or the like.

Note that a siloxane-based resin corresponds to a resin including a Si—O—Si bond formed using a siloxane-based material as a starting material. A siloxane-based resin may include an organic group (e.g., an alkyl group or an aryl group) or a fluoro group as a substituent. In addition, the organic group may include a fluoro group. A siloxane-based resin is applied by a coating method and baked; thus, the insulating film 419 can be formed.

Note that the insulating film 419 may be formed by stacking a plurality of insulating films each formed using any of the above materials. For example, the insulating film 419 may have a structure in which an organic resin film is stacked over an inorganic insulating film.

FIGS. 7A and 7B illustrate an example of a display panel including a liquid crystal element as a display element. FIG. 7A is a plan view of a display panel, and FIG. 7B is a cross-sectional view along E-F in FIG. 7A. The structure of the panel including the liquid crystal element shown in this embodiment can be employed as the structure of the shutter panel as appropriate.

In FIG. 7B, a sealant 605 is provided so as to surround a pixel portion 602 and a scan line driver circuit 604 which are provided over a first substrate 601. A second substrate 606 is provided over the pixel portion 602 and the scan line driver circuit 604. Thus, the pixel portion 602 and the scan line driver circuit 604 are sealed together with the display element by the first substrate 601, the sealant 605, and the second substrate 606.

In FIG. 7A, a signal line driver circuit 603 that is formed using a single crystal semiconductor film or a polycrystalline semiconductor film over a substrate separately prepared is mounted in a region different from the region surrounded by the sealant 605 over the first substrate 601. A variety of signals and potentials are supplied to the signal line driver circuit 603, the scan line driver circuit 604, and the pixel portion 602 from an FPC 618.

In FIGS. 7A and 7B, the display panel includes a connection terminal electrode 615 and a terminal electrode 616. The connection terminal electrode 615 and the terminal electrode 616 are electrically connected to a terminal of the FPC 618 via an anisotropic conductive film 619. The connection terminal electrode 615 is formed using the same conductive film as a first electrode layer 630 of the liquid crystal element, and the terminal electrode 616 is formed using the same conductive film as source and drain electrodes of transistors 610 and 611.

The pixel portion 602 and the scan line driver circuit 604, which are provided over the first substrate 601, each include a plurality of transistors. FIG. 7B illustrates the transistor 610 included in the pixel portion 602 and the transistor 611 included in the scan line driver circuit 604.

In FIG. 7B, a liquid crystal element 613, which is the display element, includes the first electrode layer 630, a second electrode layer 631, and the liquid crystal layer 608. Insulating films 632 and 633 serving as alignment films are provided so that the liquid crystal layer 608 is sandwiched therebetween. The second electrode layer 631 is provided on the second substrate 606 side, and the first electrode layer 630 and the second electrode layer 631 are stacked with the liquid crystal layer 608 placed therebetween.

A columnar spacer 635 is obtained by selective etching of an insulating film. The spacer is provided to control the thickness (cell gap) of the liquid crystal layer 608. Alternatively, a spherical spacer may be used.

In the case where a liquid crystal element is used as the display element, thermotropic liquid crystal, low-molecular liquid crystal, high-molecular liquid crystal, polymer dispersed liquid crystal, ferroelectric liquid crystal, anti-ferroelectric liquid crystal, or the like can be used. These liquid crystal materials exhibit a cholesteric phase, a smectic phase, a cubic phase, a chiral nematic phase, an isotropic phase, or the like depending on conditions.

Alternatively, liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which several weight percent or more of a chiral material is mixed is used for the liquid crystal layer in order to extend the temperature range. The liquid crystal composition that includes a liquid crystal showing a blue phase and a chiral agent has a short response time of 1 ms (millisecond) or less and has optical isotropy; therefore, the alignment process is not necessary and viewing angle dependence is small. In addition, since an alignment film does not need to be provided and rubbing treatment is unnecessary, electrostatic discharge caused by the rubbing treatment can be prevented and defects and damage of the display panel can be reduced in the manufacturing process. Thus, the productivity of the display panel can be increased.

The specific resistivity of the liquid crystal material is $1\times10^9$ Ω·cm or more, preferably $1\times10^{11}$ Ω·m or more, further preferably $1\times10^{12}$ Ω·cm or more. The value of the specific resistivity in this specification is measured at 20° C.

For the display panel including the liquid crystal elements (the liquid crystal display panel), a twisted nematic (TN) mode, an in-plane-switching (IPS) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, or the like can be used.

The display panel in this embodiment can be a normally black liquid crystal display panel such as a transmissive liquid crystal display panel utilizing a vertical alignment (VA) mode. The vertical alignment mode is a method of controlling alignment of liquid crystal molecules of a liquid crystal display panel, in which liquid crystal molecules are aligned orthogonally to a panel surface when no voltage is applied. There are some examples of the vertical alignment mode, and for instance, a multi-domain vertical alignment (MVA) mode, a patterned vertical alignment (PVA) mode, or an advanced super view (ASV) mode can be employed. Moreover, it is possible to use a method called domain multiplication or multi-domain design, in which a pixel is divided into several regions (subpixels) and molecules are aligned in different directions in their respective regions.

In the display panel described in this embodiment, a black matrix (a light-shielding layer), an optical member (an optical substrate) such as a polarizing member, a retardation member, or an anti-reflection member, and the like are provided as appropriate. For example, circular polarization may be obtained by using a polarizing substrate and a retardation substrate. In addition, a backlight, a side light, or the like may be used as a light source for the liquid crystal display panel.

As a display method in the pixel portion, a progressive method, an interlace method, or the like can be employed. Further, color elements controlled in a pixel at the time of color display are not limited to three colors: R, G, and B (R, G, and B correspond to red, green, and blue). For example, R, G, B, and W (W corresponds to white); or R, G, B, and one or more of yellow, cyan, magenta, and the like can be used. Note that the size of display regions may be different between dots of color elements. This embodiment is not limited to the application to a display panel for color display but can also be applied to a display panel for monochrome display.

The display device according to one embodiment of the present invention can be provided by applying the display panel described in this embodiment to the display panel in Embodiment 1.

Note that this embodiment can be implemented in appropriate combination with the structures described in the other embodiments.

Embodiment 4

The display device according to one embodiment of the present invention may include a position input device called a touch panel. In this embodiment, a description is given using FIGS. 8A and 8B of an example of the structure of a shutter panel that is applicable to the display device in one embodiment of the present invention and includes a touch panel.

Figure 8A:
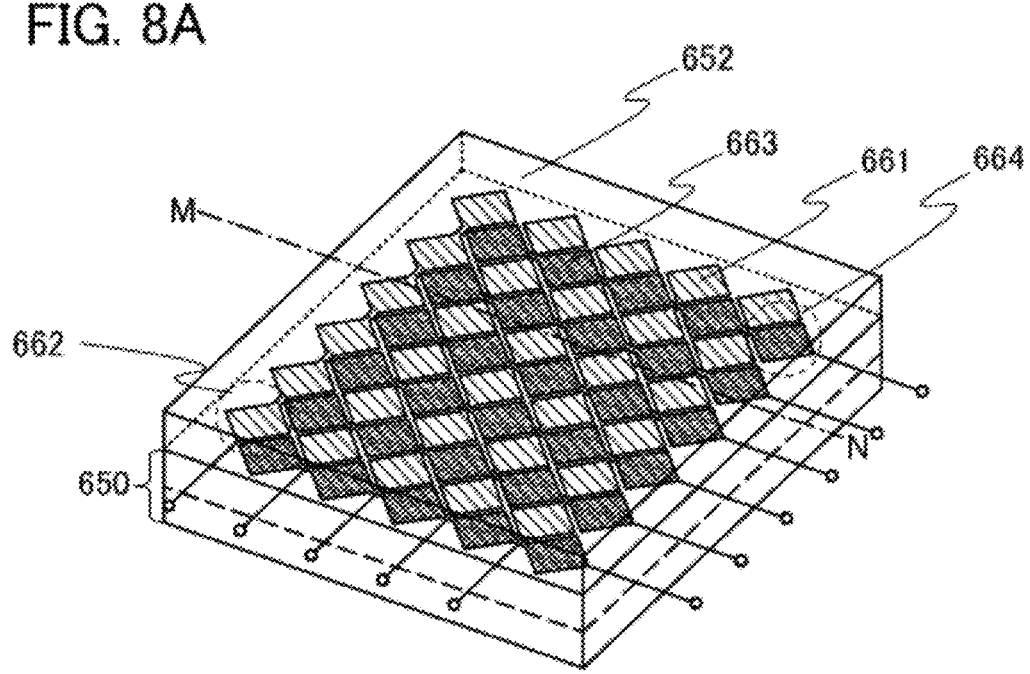
FIGS. 8A and 8B illustrate a shutter panel including a touch panel according to an embodiment.
Figure 8B:
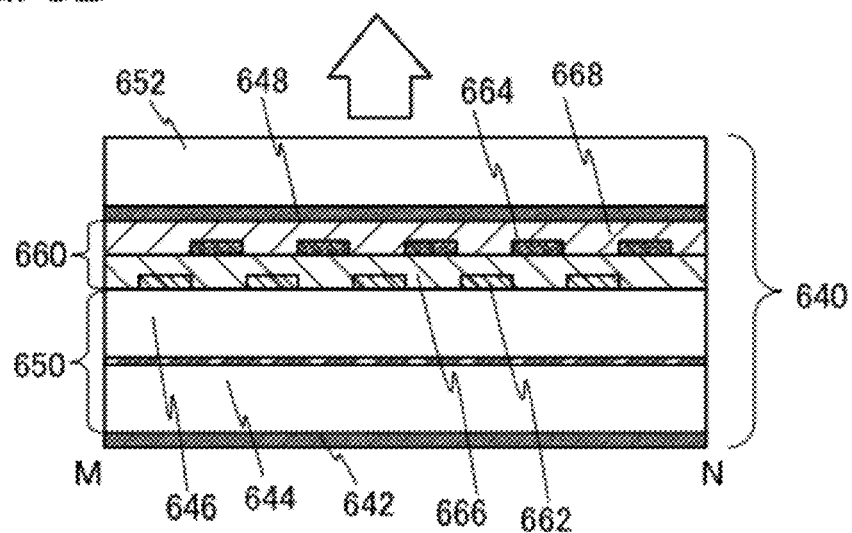

FIG. 8A is a perspective view of a shutter panel shown in this embodiment. FIG. 8B is a cross-sectional view along M-N in FIG. 8A. Note that in FIG. 8A, some of components (e.g., a polarizing plate) are omitted in order to avoid complexity of the drawing.

A shutter panel 640 illustrated in FIGS. 8A and 8B includes a first polarizing plate 642, a liquid crystal element unit 650, a touch panel unit 660 provided to overlap with the liquid crystal element unit 650, a second polarizing plate 648, and a substrate 652 provided in contact with the second polarizing plate 648.

The liquid crystal element unit 650 includes a plurality of liquid crystal elements provided between a substrate 644 and a substrate 646. The plurality of liquid crystal elements can have the structure shown in Embodiment 2.

An arrow in FIG. 8B indicates the direction of emitted light, which means that a display panel is provided on the first polarizing plate 642 side in the display device according to one embodiment of the present invention.

For the touch panel unit 660, the capacitive touch technology can be used, for example. FIGS. 8A and 8B show an example of the structure using a projected capacitive touch technology. The touch panel unit 660 includes a plurality of first electrodes 662, an insulating layer 666 covering the first electrodes 662, a plurality of second electrodes 664, and an insulating layer 668 covering the second electrodes 664.

The first electrode 662 has a structure where a plurality of rectangular conductive films 661 are connected to each other. The second electrode 664 has a structure where a plurality of rectangular conductive films 663 are connected to each other. The plurality of the first electrodes 662 and the plurality of the second electrodes 664 overlap with each other so that the positions of the rectangular conductive films 661 are different from those of the rectangular conductive films 663. Note that the shapes of the first electrodes 662 and the second electrodes 664 are not limited to the above.

The first electrode 662 and the second electrode 664 can be formed using a light-transmitting conductive material, for example, indium tin oxide containing silicon oxide (ITSO), indium tin oxide (ITO), zinc oxide (ZnO), indium zinc oxide, or zinc oxide to which gallium is added (GZO).

One example of the shutter panel including the touch panel unit described in this embodiment has a structure in which the touch panel unit 660 is stacked between the first polarizing plate 642 and the second polarizing plate 648 which constitute the shutter panel. This structure can reduce the number of components as compared to the case where a shutter panel and a touch panel are manufactured separately and provided in a display device. As a result, manufacturing costs of the display device can be reduced. Moreover, the weight and thickness of the display device can be reduced.

Note that this embodiment can be implemented in appropriate combination with the structures described in the other embodiments.

Embodiment 5

The display device according to one embodiment of the present invention can be used for laptops and image reproducing devices provided with recording media (typically, devices that reproduce the content of recording media such as digital versatile discs (DVDs) and have displays for displaying the reproduced images). Other examples of electronic devices that can include the display device according to one embodiment of the present invention are mobile phones, portable game consoles, personal digital assistants, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATM), and vending machines. In this embodiment, specific examples of such electronic devices will be described with reference to FIGS. 9A to 9C.

Figure 9A:
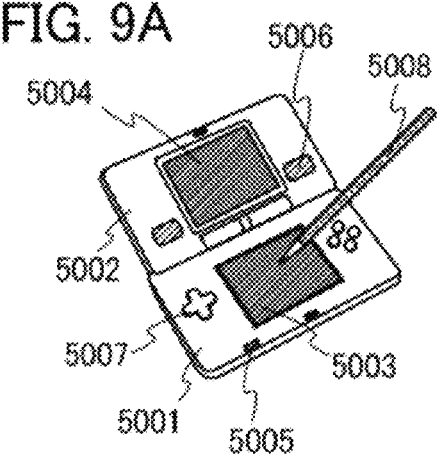
FIGS. 9A to 9C each illustrate an electronic device according to an embodiment.

FIG. 9A illustrates a portable game console including a housing 5001, a housing 5002, a display portion 5003, a display portion 5004, a microphone 5005, speakers 5006, operation keys 5007, and a stylus 5008. The display device according to one embodiment of the present invention can be used as the display portion 5003 or the display portion 5004. By using the display device according to one embodiment of the present invention as the display portion 5003 or the display portion 5004, it is possible to provide a highly convenient portable game console capable of displaying 3D images. Although the portable game console in FIG. 9A has the two display portions 5003 and 5004, the number of display portions included in a portable game console is not limited to this.

Figure 9B:
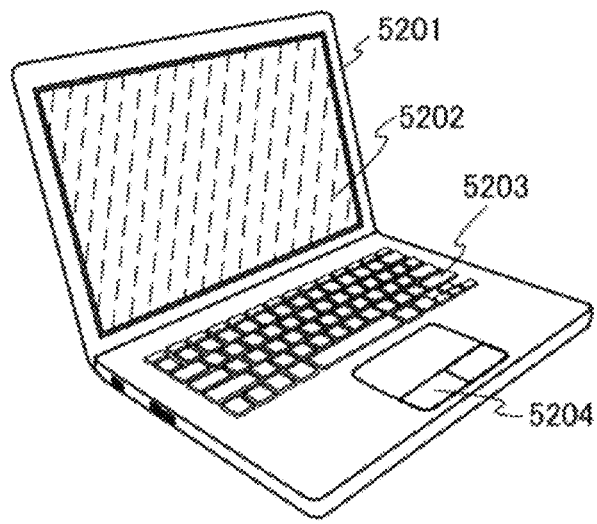

FIG. 9B illustrates a laptop personal computer including a housing 5201, a display portion 5202, a keyboard 5203, and a pointing device 5204. The display device according to one embodiment of the present invention can be used for the display portion 5202. By using the display device according to one embodiment of the present invention as the display portion 5202, it is possible to provide a highly convenient laptop personal computer capable of displaying 3D images.

Figure 9C:
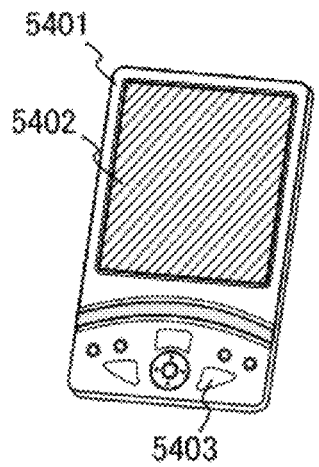
Figure 10A:
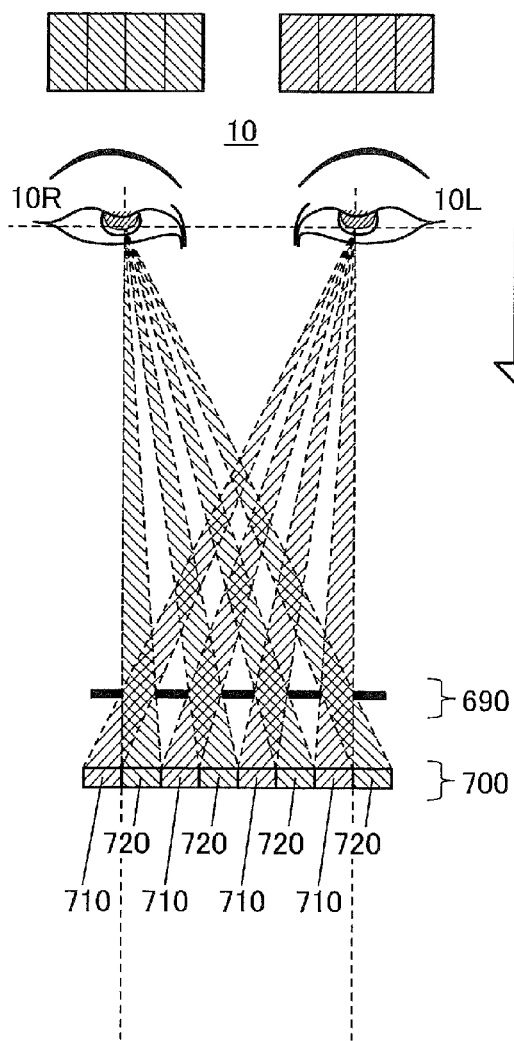
FIGS. 10A and 10B illustrate a conventional technique.
Figure 10B:
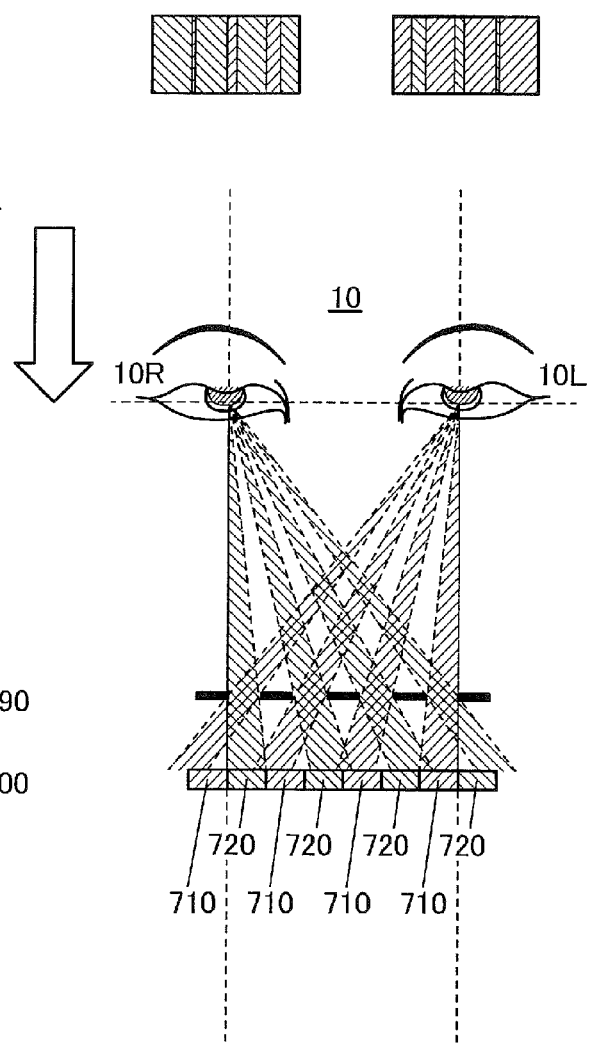

FIG. 9C illustrates a personal digital assistant including a housing 5401, a display portion 5402, and operation keys 5403. The display device according to one embodiment of the present invention can be used as the display portion 5402. By using the display device according to one embodiment of the present invention as the display portion 5402, it is possible to provide a highly convenient personal digital assistant capable of displaying 3D images.

This embodiment can be implemented in appropriate combination with the structures described in the other embodiments.

EXAMPLE

In this example, the structure of a fabricated 3D display device which is one embodiment of the present invention will be described with reference to FIG. 12. In addition, a method for evaluation and evaluation results of crosstalk observed 30 cm away from the fabricated 3D display device will be described with reference to FIGS. 13A-L, 13A-R, and 13B and FIG. 14.

<Structure>

Figure 12:
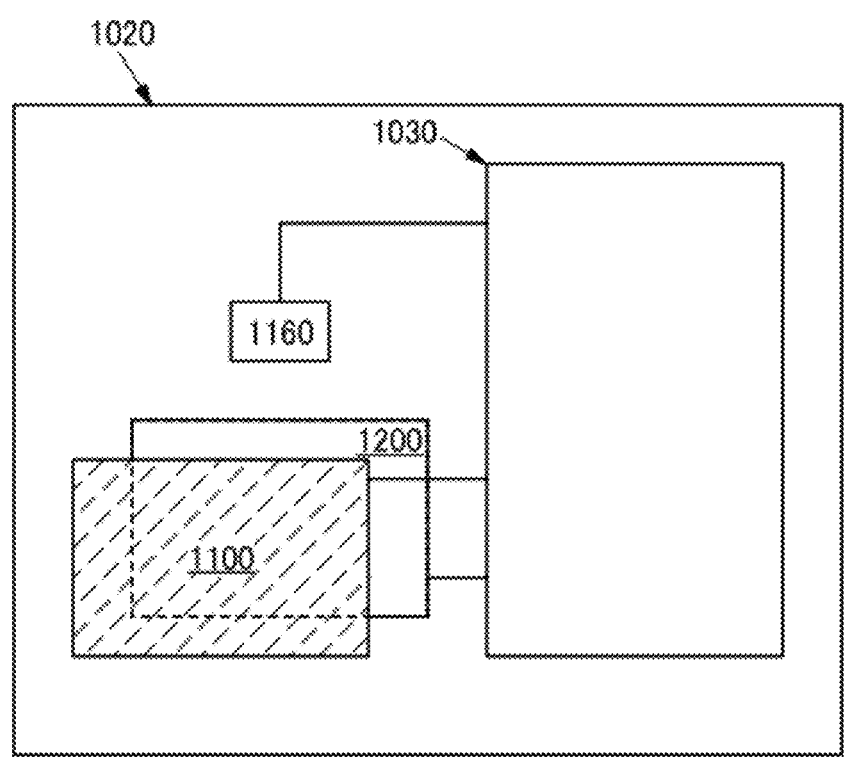
FIG. 12 is a block diagram illustrating a 3D display device according to an example.

FIG. 12 is a block diagram of a fabricated 3D display device 1020. The fabricated 3D display device 1020 includes a display panel 1200, a shutter panel 1100 in which a parallax barrier is formed, an ultrasonic sensor 1160, and a control device 1030.

The fabricated display panel 1200 is an active matrix organic EL panel provided with a driver circuit unit (a source driver circuit and a gate driver circuit) formed over the same substrate. The display panel 1200 has a pixel region that is 3.9 inches diagonally. In the pixel region, a plurality of pixels are arranged in a 1440 by 1080 matrix. Each of the pixels has three sub-pixels. The resolution is 458 ppi.

The sub-pixel is 55.5 µm wide and 18.5 µm long. The aperture ratio is 60%. Three sub-pixels emit light of red (R), green (G), and blue (B), respectively, and sub-pixels for each color are arranged in a horizontal stripe pattern.

The fabricated shutter panel 1100 is an active matrix shutter panel that is provided with a driver circuit unit formed over the same substrate and includes a transistor provided for each electrode. The shutter panel 1100 has a region where a parallax barrier with a diagonal of 3.9 inches is formed. In the region, 5760 light-transmitting electrodes with a width of 11.75 µm are provided in a vertical stripe pattern. The distance between two vertical-striped electrodes adjacent to each other is the smallest (specifically 2 µm) at the center of the region where the parallax barrier is formed, and is the largest (specifically 2.25 µm) at right and left ends of the region. This is because a viewer is likely to use the 3D display device most frequently when being directly in front of the center of the device.

The shutter panel 1100 is provided on the display surface side of the display panel 1200 to overlap the display panel 1200. Note that four vertical-striped electrodes in the shutter panel 1100 overlap one pixel in the display panel 1200.

Further, in the shutter panel 1100, the vertical-striped electrode and a counter electrode between which a nematic liquid crystal layer is sandwiched are provided between a pair of polarizing plates. The liquid crystal element is driven to block incident light, whereby the parallax barrier is formed.

The transistor in the shutter panel 1100 includes a crystalline oxide semiconductor layer having c-axis alignment, specifically an InGaZnO-based oxide semiconductor layer. The transistor has a channel width of 50 µm and a channel length of 6 µm, and is of normally off type. The threshold voltage of the transistor is 1.1 V and the off-state current at 85° C. is 100 yA ($10^{-22}$ A) per channel width of 1 µm.

Figure 16:
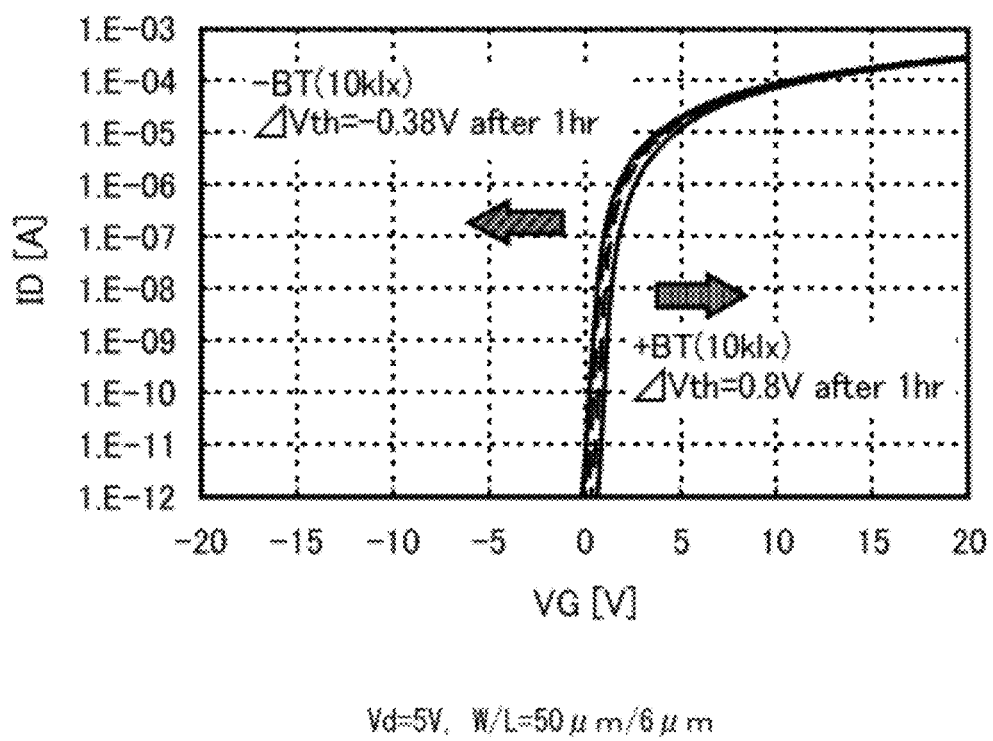
FIG. 16 shows characteristics of a transistor.

FIG. 16 shows characteristics of the fabricated transistor after undergoing the following tests with an illuminance of 10 klx: a test for keeping the transistor at 80° C. for 1 hour with a gate potential of +20 V (+BT test), and a test for keeping the transistor for 1 hour with a gate potential of −20 V (−BT test). The right solid line indicates the characteristics of the transistor after undergoing the +BT test, and the left solid line indicates the characteristics of the transistor after undergoing the −BT test. The dashed line between the two solid lines indicates the characteristics of the transistor before undergoing these tests.

The shift of the threshold voltage was −0.38 V after the −BT test and +0.8 V after the +BT test.

The ultrasonic sensor 1160 was used to detect the position of the viewer. The ultrasonic sensor 1160 has a time resolution of 20 ms and an angular resolution of 0.5°.

Figure 17A:
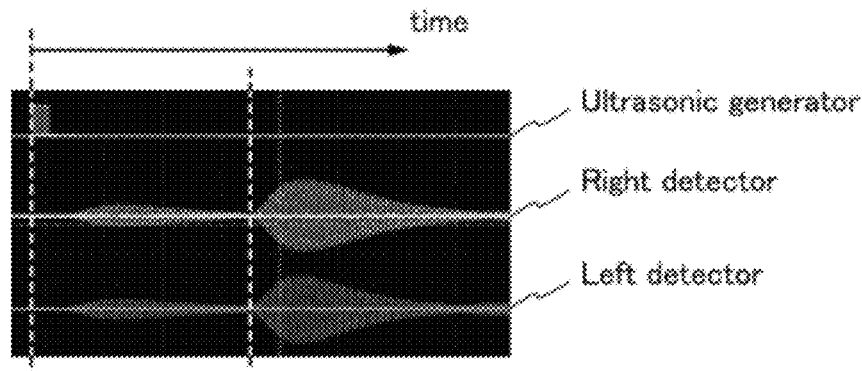
FIGS. 17A to 17D are diagrams for explaining an ultrasonic sensor.
Figure 17B:
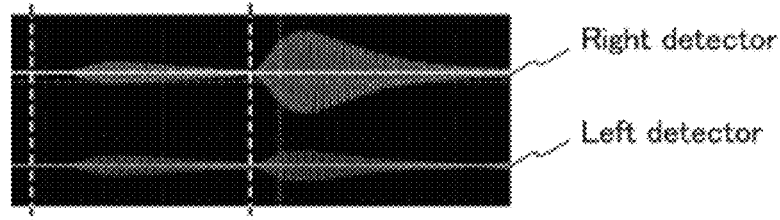
Figure 17C:
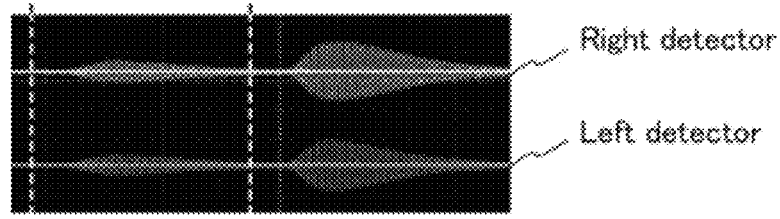

The position of an object is detected in the following manner: the object reflects an ultrasonic wave emitted from a generator of the ultrasonic sensor and detectors of the ultrasonic sensor receive a reflected wave. FIGS. 17A to 17C show examples of reflected waves received by the ultrasonic sensor.

FIG. 17A shows an example of the result of detecting a reflected wave when the object is placed at a first position, where the object is directly in front of the ultrasonic sensor. Right and left detectors detected reflected waves with the same amplitude at about the same time.

FIG. 17B shows an example of the result of detecting a reflected wave when the object is placed at a second position, where the object is closer to the right side without changing the distance to the ultrasonic sensor. Although the right and left detectors detected reflected waves at about the same time, the amplitude of the reflected wave detected by the right detector was larger than that detected by the left detector.

FIG. 17C shows an example of the result of detecting a reflected wave when the object is placed at a third position, at which the object is directly in front of the ultrasonic sensor and which is more distant from the ultrasonic sensor than the first position. Although the right and left detectors detected reflected waves with about the same amplitude, the reflected waves were delayed compared to the case where the object was placed at the first position.

Figure 17D:
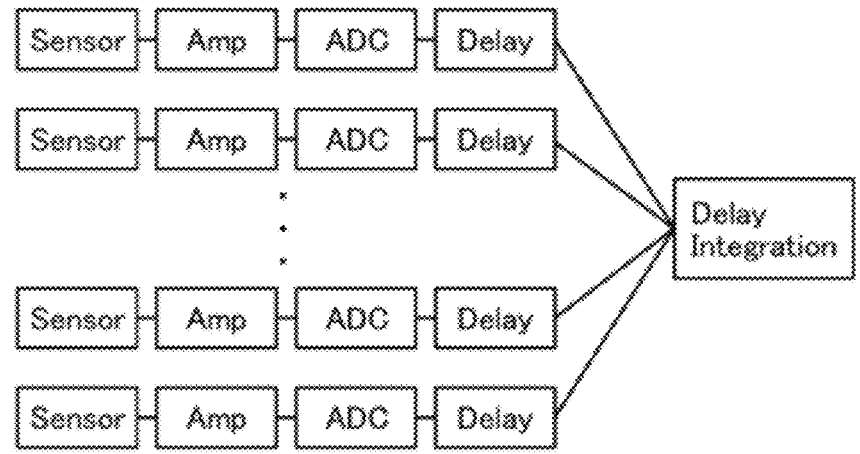

A plurality of sensors (Sensor) were arranged in array; each sensor connected in series with an amplifier (Amp), an analog-to-digital converter (ADC), and a delay circuit (Delay) was connected in parallel with a delay integration circuit (Delay Integration); and delay integration was performed to detect the position (angle and distance) of the object (see FIG. 17D).

<Evaluation Method>

The degree of crosstalk caused 30 cm away from the fabricated 3D display device was evaluated. The method for evaluation will be explained below.

FIGS. 13A-L and 13A-R show images used for evaluation. Two kinds of images, a right-eye image and a left-eye image, were used for evaluation, and each of the images contains four squares (two small squares and two large squares).

In the left-eye image and the right-eye image, the large squares are drawn with different colors. Specifically, a large black square is drawn on the left side of a large white square in the left-eye image (see FIG. 13A-L), whereas a large black square is drawn on the right side of a large white square in the right-eye image (see FIG. 13A-R).

Then, the left-eye image was displayed on a first pixel region for the left eye and the right-eye image was displayed on a second pixel region for the right eye in the display panel 1200, and the images were observed under the following conditions.

The images were observed 30 cm away from the center of the display panel 1200 in the fabricated 3D display device, from the direct front and from positions inclined to the right and left from the direct front at angles up to 14° in 2° increments (see FIG. 13B). The results of observation under 15 different conditions were recorded using a 3D digital image system 1300 (FinePix REAL 3D W3 manufactured by Fujifilm Corporation).

The 3D digital image system 1300 has two CCD cameras that are distanced from each other and provided on either side, and can independently record an image seen by the left eye and an image seen by the right eye by using the cameras.

<Evaluation Results>

The fabricated 3D display device followed the position of the viewer every 50 ms. The angular resolution was 2°. FIG. 14 shows images displayed by the fabricated 3D display device; the uppermost column shows the result of observation from the position directly in front of the 3D display device, and the underlying columns show the results of observation from the positions inclined to the right and left from the direct front at angles up to 14° in 2° increments.

In the fabricated 3D display device, the image same as that seen from the direct front was observed even from the positions inclined to the right and left from the direct front at an angle of 14°. These results proved that the area where the viewer can perceive 3D images with the naked eye was extended.

<Comparative Example>

A parallax barrier optimized for observation from the direct front was formed by using the fabricated 3D display device. As a comparative example, the degree of crosstalk measured 30 cm away from the 3D display device was evaluated while the mode of the parallax barrier is fixed at the optimized state. That is, the 3D display device exemplified in the comparative example has a parallax barrier whose mode is fixed regardless of the position of observation.

By the method described in this example, the fabricated 3D display device was evaluated 30 cm away from the center of the display panel 1200 in the 3D display device of the comparative example from the direct front and from positions inclined to the right and left from the direct front at angles up to 14° in 2° increments.

<Evaluation Results of Device According to Comparative Example>

FIG. 15 shows images displayed by the 3D display device in the comparative example; the uppermost column shows the result of observation from the position directly in front of the 3D display device, and the underlying columns show the results of observation from the positions inclined to the right and left from the direct front at angles up to 14° in 2° increments.

In the case of the 3D display device of the comparative example, significant crosstalk was seen from the positions inclined to the right and left from the direct front at an angle of 4° or more. The left eye saw the right-eye image and the right eye saw the left-eye image from the positions inclined at an angle of 8° or more. These results showed that the area where a viewer can perceive 3D images with the naked eye was small with the 3D display device having a parallax barrier with a fixed mode.

This application is based on Japanese Patent Application serial No. 2011-054824 and No. 2011-259801 filed with Japan Patent Office on Mar. 11, 2011 and Nov. 29, 2011, respectively, the entire contents of which are hereby incorporated by reference.

What is claimed is:

1. A display device comprising:
a display panel including a first pixel region for a left eye of a viewer and a second pixel region for a right eye of the viewer;
a parallax barrier that covers part of the display panel and is variable in a mode;
a parallax barrier control circuit configured to control the mode of the parallax barrier;
an ultrasonic generator configured to emit an ultrasonic wave, and
a plurality of detectors configured to detect the ultrasonic wave reflected from the viewer,
wherein the parallax barrier control circuit is configured to control a size of the parallax barrier in accordance with a position of the viewer moving along the display panel such that the parallax barrier prevents the right eye from seeing the first pixel region and the left eye from seeing the second pixel region, and
wherein the position of the viewer is specified by the plurality of detectors.

2. The display device according to claim 1,
wherein the parallax barrier includes a liquid crystal layer sandwiched between a pair of substrates, and
wherein at least one of the pair of substrates is provided with a plurality of electrodes for controlling alignment of liquid crystals in the liquid crystal layer, and each of the plurality of electrodes is electrically connected to the parallax barrier control circuit.

3. The display device according to claim 1, wherein the mode of the parallax barrier is a stripe pattern, a checkered pattern, or a crossed pattern.

4. The display device according to claim 1, wherein a display element provided in the display panel is an organic electroluminescent element.

5. The display device according to claim 1, wherein a display element provided in the display panel is a liquid crystal element.

6. A display device comprising:
a display panel including a first pixel region for a left eye of a viewer and a second pixel region for a right eye of the viewer;
a parallax barrier that covers part of the display panel and is variable in a mode;
a parallax barrier control circuit configured to control the mode of the parallax barrier;
a plurality of ultrasonic generators configured to emit an ultrasonic wave, and
a plurality of detectors configured to detect the ultrasonic wave reflected from the viewer,
wherein the parallax barrier control circuit is configured to control a size of the parallax barrier in accordance with a position of the viewer moving along the display panel such that the parallax barrier prevents the right eye from seeing the first pixel region and the left eye from seeing the second pixel region, wherein the position of the viewer is moved along a line from a center portion to an outer edge portion of the display panel, and wherein the position of the viewer is specified by the plurality of detectors.

7. The display device according to claim 6, wherein the parallax barrier includes a liquid crystal layer sandwiched between a pair of substrates, and wherein at least one of the pair of substrates is provided with a plurality of electrodes for controlling alignment of liquid crystals in the liquid crystal layer, and each of the plurality of electrodes is electrically connected to the parallax barrier control circuit.

8. The display device according to claim 6, wherein the mode of the parallax barrier is a stripe pattern, a checkered pattern, or a crossed pattern.

9. The display device according to claim 6, wherein a display element provided in the display panel is an organic electroluminescent element.

10. The display device according to claim 6, wherein a display element provided in the display panel is a liquid crystal element.

\* \* \* \* \*